March 27, 1945.  C. JOHNSON  2,372,426

DUPLICATOR FOR MACHINE TOOLS

Filed March 20, 1941  13 Sheets-Sheet 1

Inventor

CLARENCE JOHNSON

By Raymond D. Junkins

Attorney

March 27, 1945.　　　C. JOHNSON　　　2,372,426
DUPLICATOR FOR MACHINE TOOLS
Filed March 20, 1941　　　13 Sheets-Sheet 2

Inventor
CLARENCE JOHNSON
By Raymond W. Junkins
Attorney

March 27, 1945.  C. JOHNSON  2,372,426
DUPLICATOR FOR MACHINE TOOLS
Filed March 20, 1941  13 Sheets-Sheet 3

Inventor
CLARENCE JOHNSON
By Raymond W. Junkins
Attorney

Inventor
CLARENCE JOHNSON
By Raymond W. Jenkins
Attorney

March 27, 1945. C. JOHNSON 2,372,426
DUPLICATOR FOR MACHINE TOOLS
Filed March 20, 1941 13 Sheets-Sheet 9

Inventor
CLARENCE JOHNSON
By Raymond W. Jenkins
Attorney

March 27, 1945.　　　C. JOHNSON　　　2,372,426
DUPLICATOR FOR MACHINE TOOLS
Filed March 20, 1941　　13 Sheets-Sheet 10

Inventor
CLARENCE JOHNSON
By Raymond D. Junkins
Attorney

March 27, 1945. C. JOHNSON 2,372,426
DUPLICATOR FOR MACHINE TOOLS
Filed March 20, 1941 13 Sheets-Sheet 11

Inventor
CLARENCE JOHNSON
By Raymond D. Junkins
Attorney

March 27, 1945. C. JOHNSON 2,372,426
DUPLICATOR FOR MACHINE TOOLS
Filed March 20, 1941 13 Sheets-Sheet 13

Inventor
CLARENCE JOHNSON
By Raymond W Jenkins
Attorney

Patented Mar. 27, 1945

2,372,426

UNITED STATES PATENT OFFICE 2,372,426

DUPLICATOR FOR MACHINE TOOLS

Clarence Johnson, South Euclid, Ohio, assignor to Bailey Meter Company, a corporation of Delaware Application March 20, 1941, Serial No. 384,375

21 Claims. (Cl. 90—13.5)

This invention relates to duplicators for controlling the operation of a machine tool so that it forms a work piece to a contour or configuration determined by a template, pattern, or cam.

One of the objects of my invention is to improve the sensitivity of duplicators of the type described, and thereby increase the accuracy with which the work piece is formed.

A further object of my invention is to provide a duplicator of materially simpler construction than those now available.

A further object of my invention is to provide a duplicator employing no moving parts in the feeler mechanism scanning the template, pattern or cam.

In accordance with my invention the template, pattern or cam for producing the desired configuration of the work piece is scanned by a jet of fluid issuing from a nozzle, so that variations in the shape of the template, pattern or cam cause corresponding changes in the rate at which fluid is discharged from the nozzle, which changes in turn control the relative movement of the tool and work piece.

Further, in accordance with my invention the changes in the rate at which fluid is discharged from the nozzle effect corresponding variations in the pressure of the fluid in the nozzle, which latter variations are used to control the relative positioning of the tool and work piece.

Further, in accordance with my invention the changes in fluid pressure control the relative positioning of the tool and work piece through a hydraulic relay and servo-motor, to the end that ample power is available for accurately positioning the tool relative to the work piece.

Further, in accordance with my invention the relative rates of movement between the tool and work piece in two directions are simultaneously controlled, so that the rate of feed of the tool remains substantially constant regardless of changes in contour of the template, pattern or cam.

Further, in accordance with my invention separate and independent means are provided for controlling the rate of relative movement between tool and work piece in each direction.

Obviously, a duplicator of the type forming the subject matter of my invention may be employed with machine tools of various types, such as milling machines, lathes, slotters, planers, die-sinking machines and the like in which the relative feed between the tool and work may be suitably controlled. By way of example I will illustrate and describe my invention as applied to a few specific types of machine tools. Further applications and modifications of my invention will be readily apparent.

Figure 1:
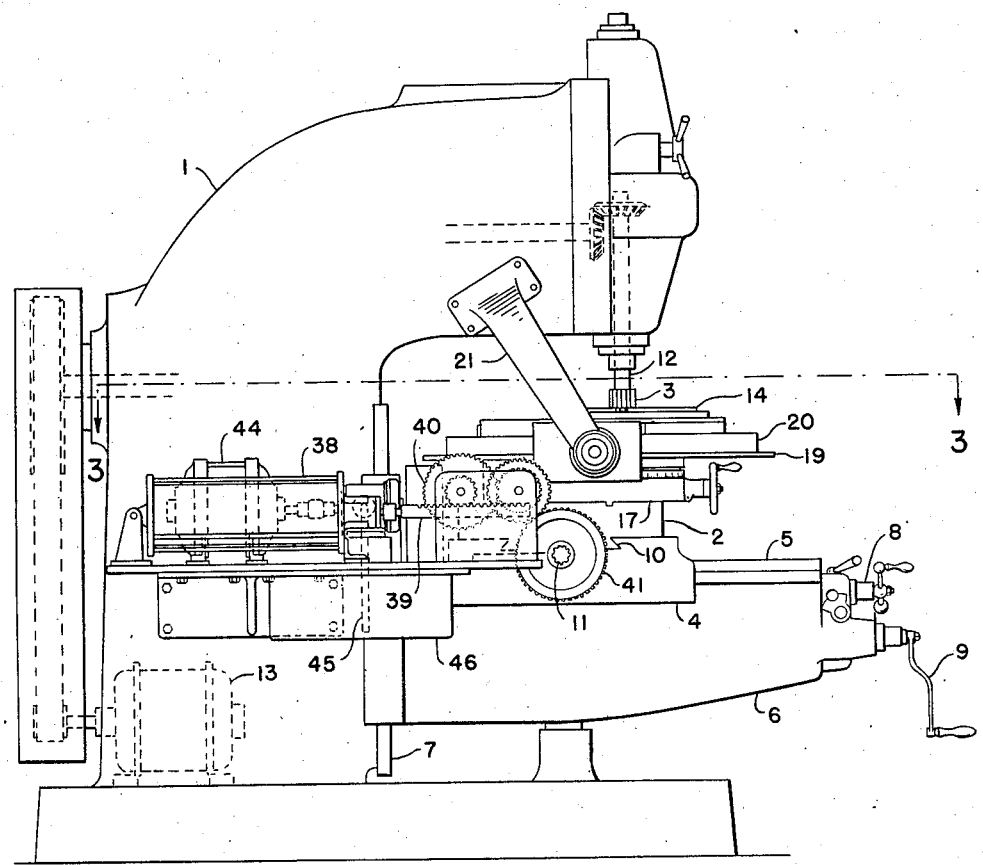
Fig. 1 is a side elevation and Fig. 2 is a front elevation of a vertical milling machine illustrating the application of my invention thereto.
Figure 2:
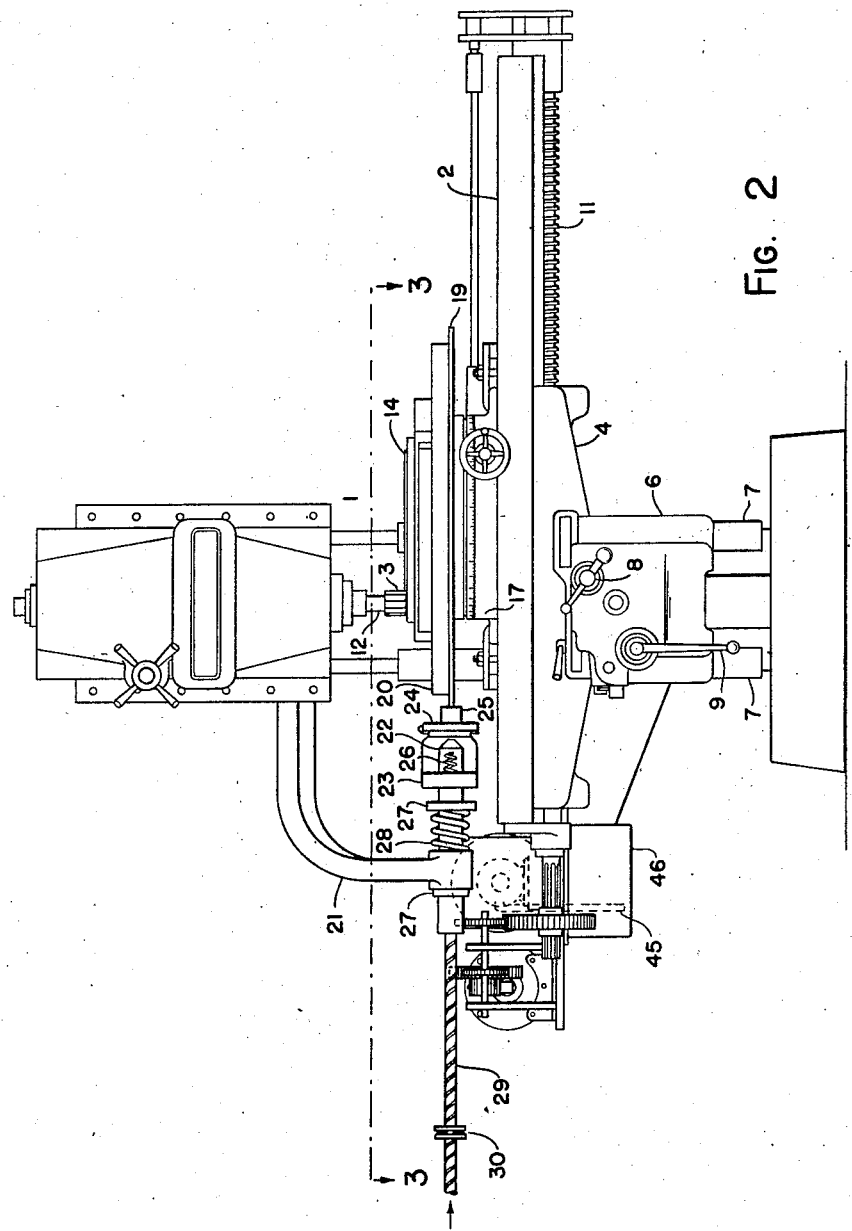
Figure 3:
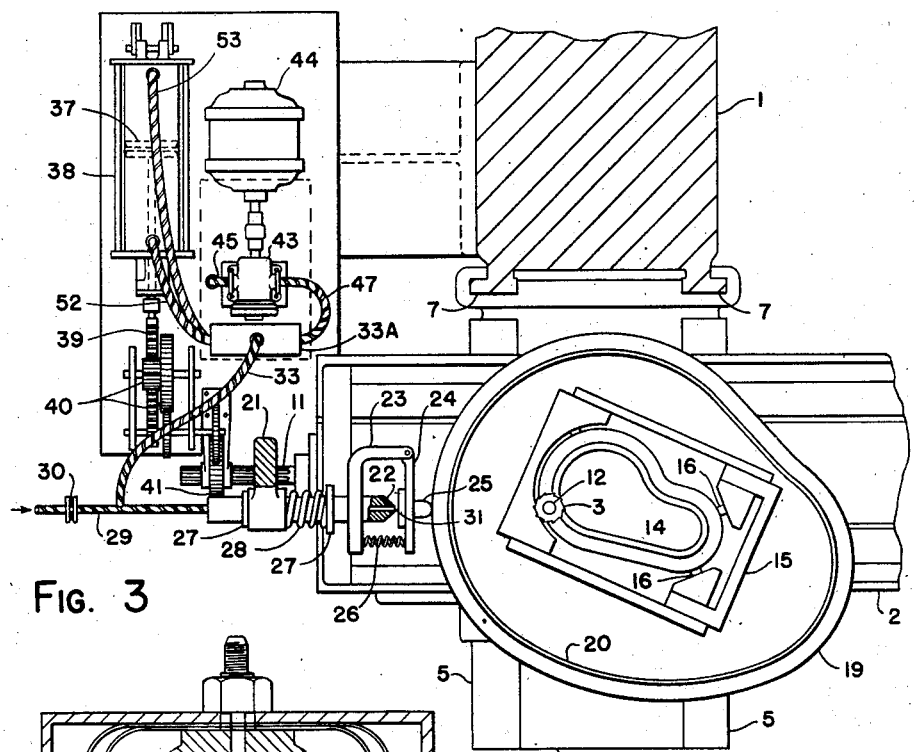
Fig. 3 is a sectional view taken along the line 3—3 of Figs. 1 and 2 in the direction of the arrows.

Referring now to Figs. 1, 2 and 3, I therein show a vertical milling machine having a column 1, a work table 2, and a rotatable form milling cutter 3. The work table 2 is carried in a saddle 4 mounted on horizontal guide ways 5 carried by a knee 6 which is supported in vertical guide ways 7 formed on the column 1. A micrometer hand wheel 8 is provided for positioning the saddle 4 along the guide ways 5. A similar hand wheel 9 is provided for positioning the knee 6 along the vertical guide ways 7. The work table 2 is mounted on a horizontal guideway 10 formed in the saddle 4 and is positionable relative thereto by a lead screw 11. The cutter 3 is secured to a spindle 12 rotated by a motor 13, which may be further adapted to position the work table 2 along one or more of the guideways as well known.

At 14 is shown a typical work piece consisting of a concave forging of more or less elliptical shape and in rough form having a raised blank face extending around its entire periphery. The machining operation I have chosen to illustrate my invention as controlling consists in forming a male flange face on this outer face. The cutter 3 is suitably shaped to relieve the outer edge of the flange, and by my invention the work piece is automatically moved relative to the cutter so that the latter accurately forms the outer profile of the raised portion of the flange.

The work piece 14 is shown as being secured to a fixture 15 by adjustable clamping means 16. Because of the nature of the machining operation to be performed the fixture 15 is mounted on a circular table 17 secured to the work table 2 and rotatable at desired speed by the motor 18 through suitable reducing gears and shafting (not shown). The machining of the work piece 14 is completed in one revolution of the circular table 17, during the revolution the work piece being moved relative to the cutter 3 to accurately profile the male flange by means now to be described.

The fixture 15 has a horizontally extending skirt 19 forming a cam or template, the contour of which is formed to produce the desired contour of the raised portion of the flange on the work piece 14. A raised barrier 20 is preferably employed to hold chips cut from the work piece from scattering.

Fastened to the column 1 is an arm 21 in which is journaled a nozzle 22. Secured to the nozzle is an extension 23 which pivotally supports a follower 24 having a projection 25 urged against the cam or template 19 by a spring 26. The nozzle 22 is preferably resiliently journaled in the arm 21 by means of spaced collars 27 and spring 28, which provide for lateral movements, thereby preventing injury to the nozzle in the event that the follower 24 is inadvertently jammed against it.

The nozzle 22 is connected to a suitable source of pressure fluid, (not shown), such as compressed air, by a flexible tube 29 in which is inserted an orifice or other partial restriction 30. Normally therefore a jet of fluid is continuously discharged from the port 31 against the follower 24, which acts as a valve member for the port, its movements toward and away from the port governing the rate of discharge of fluid therefrom. That is to say, when the follower 24 is positioned to the left, or closer to the port 31, as shown in Fig. 3, the rate of discharge from the port is decreased, whereas when the follower 24 is positioned to the right, or away from the port, the rate of discharge from the nozzle increases. Such changes in the rate of discharge from the port effect corresponding changes in the pressure of the fluid within the nozzle, a decrease in the rate of discharge effecting an increase in the pressure of the fluid within the nozzle, whereas an increase in the rate of discharge effects a corresponding decrease in fluid pressure.

As the template 19 and the work piece 14 are rotated by the circular table 17 the follower 24 will be positioned toward and away from the port 31 in accordance with changes in the configuration of the template. Such positioning of the follower 24 effects changes in the pressure of the fluid within the nozzle 22. These pressure variations are effective for positioning the work table 2, to return the follower 24 to the normal distance from the port 31. Inasmuch as in the embodiment of my invention illustrated in Figs. 1, 2 and 3 the cutter 3 is stationary, as is also the nozzle 22, it follows that if the work table 2 is positioned to maintain a normal distance between the follower 24 and port 31 the work piece 14 will upon completion of the machining operation have a configuration determined by the configuration of the template 19.

Inasmuch as the circular table 17 rotates, whereas the work piece may have a shape other than circular, and furthermore may not be concentrically located on the table with respect to the center of rotation thereof, it follows that the periphery of the work piece will not be a duplicate of that of the template 19. The proper contour of the template to give the desired shape to the work piece may be determined, as evident to those skilled in the art, by calculation or graphically.

The pattern or template has a shape corresponding to the desired path of movement of the tool to produce the desired finished work piece. By "corresponding" is meant that not only is the pattern or template the same shape as the desired work piece, either in greater or smaller proportions thereto; but also that the pattern or template is in any desired distorted shape to compensate for characteristics of the machine. While the pattern or template must correspond to the desired work piece, it is not necessarily identical in contour, and, therefore, the term "correspond" implies that the pattern or template is purposely designed to result in the desired contour of the work piece to be produced.

Figure 4:
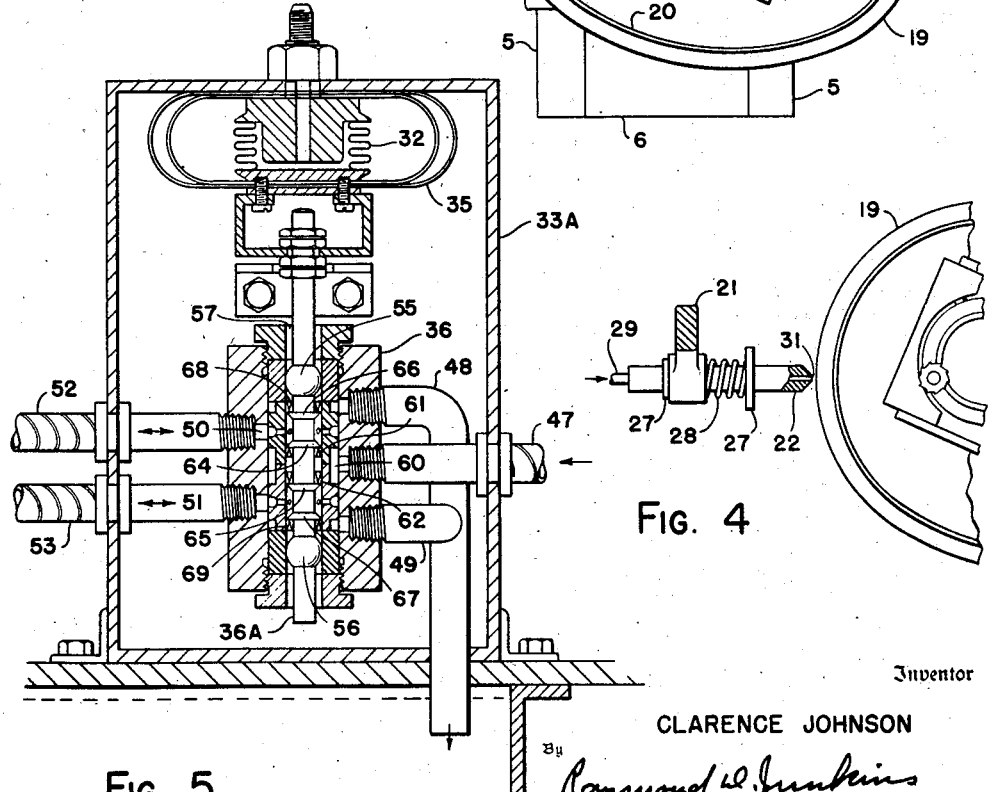
Fig. 4 illustrates a modified form of nozzle scanning mechanism.

Changes in the shape and size of the projection 25 relative to that of the cutter 3 will also modify the shape of the template 19 necessary to produce a desired shape of the work piece 14. In some instances the design of the template 19 is somewhat simplified by having the projection 25 the same shape and size as the cutter 3, and therefore I usually find it desirable to employ the construction shown in Fig. 3. However, in some instances it may be preferable to employ the construction shown in Fig. 4. As shown, the follower 24 and projection 25 are eliminated. The nozzle 22 is located immediately adjacent the template 19 so that the template itself acts as the valve member for the port 31. Other than this the construction and operation will be as described with reference to Fig. 3.

Figure 5:
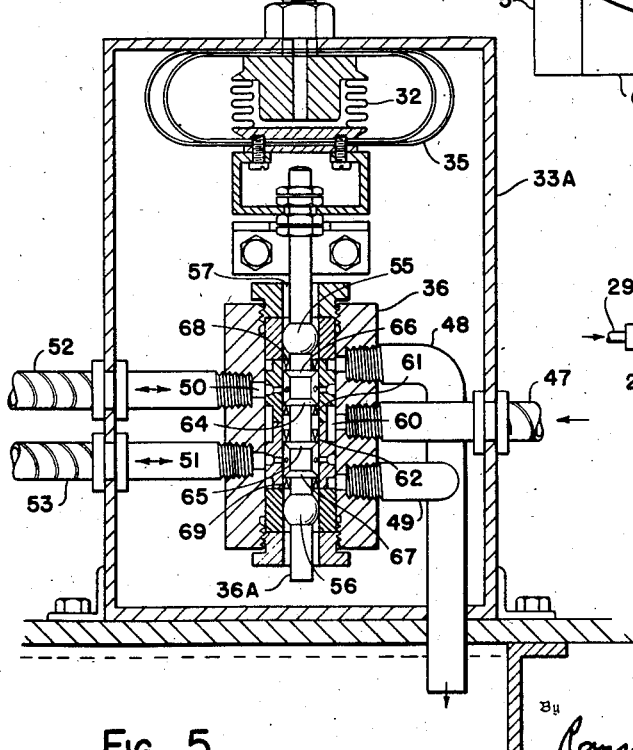
Fig. 5 is a cross-sectional view of a pilot valve for controlling the flow of fluid to and from a hydraulic servo-motor for regulating the relative feed of the tool and work piece.

Pressures established within the nozzle 22 are transmitted through a flexible tube 33 to a relay within a protecting housing 33A and shown in cross section in Fig. 5. The tube 33 connects with the interior of a bellows 32 secured to a wall of the housing 33A. The force produced by the fluid pressure acts against the lower or free head of the bellows and is opposed by the inherent resiliency of the bellows and an elliptical spring 35. The free head of the bellows will therefore assume a position corresponding to the magnitude of the fluid pressure. Movements of the lower head of the bellows position a movable valve member 36A of a hydraulic pilot valve 36 to control the flow of hydraulic fluid to and from a servo-motor 38 having a piston 37 operating the lead screw 11 through a rack 39, spur gears 40, and a final gear 41 which is splined to the lead screw to permit relative axial movement.

Assuming now that the normal distance exists between the port 31 and follower 24 a definite pressure will exist within the bellows 32, which by adjustment of the spring 35 will cause the valve member 36A to assume a neutral position, i. e. a position in which no hydraulic fluid passes between the pilot valve 36 and servo-motor 38. If now the follower 24 moves toward the port 31 the pressure within the bellows 32 will increase, causing a downward positioning of the valve member 36A, a passage of hydraulic fluid between the pilot valve 36 and servo-motor 38 causing the piston 37 to move the work table 2 in a direction to restore the port 31 and follower 24 to normal distance. Upon a decrease in fluid pressure within the bellows 32 the servo-motor 38 will position the work table 2 in opposite direction, thereby positioning the follower 24 toward the port 22 until normal distance is restored. It is apparent that by proper shaping of the template 19 the follower 24 may be moved toward and away from the port 31 as the circular table 17 revolves to effect corresponding movements of the work table 2 relative to the cutter 3 to effect accurate shaping of the work piece 14.

Hydraulic fluid, such as oil, used in positioning the piston 37 of the servo-motor 38 may be pumped by any suitable means, such as the oil pump 43 driven by a motor 44. The pump 43 is provided with an inlet pipe 45 extending into an oil reservoir 46, and a discharge pipe 47 which is connected to the inlet port 60 of the pilot valve 36. Hydraulic fluid returned from the servo-motor 38 to the pilot valve is passed to the reservoir 46 through exhaust pipes 48 and 49.

The pilot valve 36 is provided with outlet ports 50 and 51. The former being in communication with one side of the piston 37 through a pipe 52, and the latter in communication with the opposite side of the piston through a pipe 53. Downward positioning of the valve member 36A connects the outlet port 50 to the pump 43 and the outlet port 51 with the exhaust pipe 49, whereas upward positioning of the valve member connects the outlet pipe 51 with the pump 43 and the outlet port 50 with the exhaust port 48.

The movable valve member 36A is provided with sealing glands 55 and 56, which are of substantially the same diameter as the passageway 57 extending longitudinally through the pilot valve. Oil from the pump 43 is admitted under pressure through pipe 47 to the inlet port 60 which is in the form of an annular chamber. The port 60 is in communication with the passageway 57 through a plurality of equally spaced upper V-ports 61 and a similar plurality of lower V-ports 62. With the valve member 36A in the neutral position, that is in the position occupied when the follower 24 is the normal distance from the port 31, then a land 64 restricts communication between V-ports 62 and outlet port 50. Likewise a land 65 restricts communication between V-ports 62 and outlet port 51. When, however, the valve member 36A is positioned downwardly, for example, the V-ports 61 are partially uncovered so that communication is established between the inlet pipe 47 and the outlet port 50. The area of the uncovered V-ports 61 depends upon the displacement of the valve member 36A from the neutral position, and accordingly the flow of oil from the inlet pipe 47 to the outlet port 50 will vary depending upon the displacement of the valve member. Conversely, upon upward positioning of the valve member 36A from the neutral position a portion of the V-ports 62 will be uncovered, thereby permitting a proportionate flow of pressure fluid from the inlet pipe 47 to the outlet port 51.

Also carried by the valve member 36A are lands 66 and 67 cooperating with spaced V-ports 68 and 69 respectively to control the flow of pressure fluid from the outlet port 50 to the exhaust pipe 48, and from the outlet port 51 to the exhaust pipe 49. It will be noted that upon downward positioning of the valve member 36A, which establishes communication between the inlet pipe 47 and outlet port 50, communication is likewise established between the outlet port 51 and exhaust pipe 49. Pressure fluid is thus transmitted through pipe 52 to one side of the piston 37 and simultaneously withdrawn from the opposite side of the piston through pipe 53 to exhaust port 49. Upward positioning of the valve member 36A from the neutral position results in opposite action, in this instance pressure fluid being transmitted from inlet pipe 47, pipe 53, to one side of piston 37. Pressure fluid is simultaneously withdrawn from the opposite side of piston 37 through pipe 52 to outlet port 50, and thence to exhaust pipe 48. It will be noted that whenever the valve member 36A is in other than the neutral position, the piston 37 will continue to move in predetermined direction. Accordingly, upon the follower 24 being in other than the normal position, the work table 2, and the work piece 14 will be positioned until normal distance is restored. It is further evident that the rate at which the table 2 will be positioned will be dependent upon the amount of displacement of the follower 24 from the normal position relative to the port 31. If a sudden change in contour of template 19 occurs, the table 2 will be rapidly positioned but upon a relatively slow rate of change in the contour of the template a correspondingly slow change in position of the table 2 will occur. Thus the pilot valve 36 will cause the work piece to be accurately positioned relative to the cutter without overshooting or hunting.

Preferably the sealing lands 55 and 56 are of substantially the same diameter as the passageway 57, thereby preventing material leakage of oil. The lands 64, 65, 66 and 67 are however of a somewhat less diameter than the passageway 57, thereby preventing undue friction and permitting the member 36A to be freely positioned in the passageway. The pressure transmitted from the inlet pipe 47 to outlet ports 50 and 51, with the member 36A in neutral position because the lands 64 and 65 may be of somewhat less diameter than the passageway, will not affect the accuracy with which the piston 37 is positioned for such pressures will be equal and act in opposite direction on the piston 37. The system will stabilize with the pilot slightly off center to balance total pressures rather than unit pressures as would be the case with a construction where the piston rod extends through both ends of the cylinder. It will further be noted that the flows into and out of the passageway 57 are radial, so that there is no reaction on the member 36A because of the velocity of flow into and out of the passageway. Furthermore, the pressures are axially balanced due to the equal areas of lands 64, 65, 66 and 67 so that no reaction exists due to the resultant of the oil pressures acting in an upward or downward direction.

Figure 6:
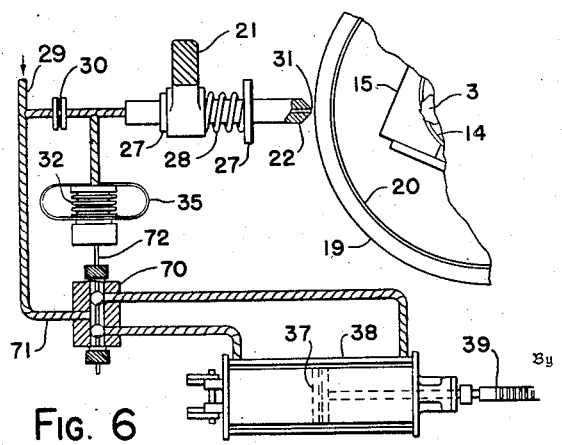
Fig. 6 illustrates diagrammatically a modified form of fluid pressure system.

While in general I have found it preferable to operate the table 2 or comparable device indirectly from the fluid pressures established within the nozzle 22 by means of a hydraulic relay, in some instances where a relatively light machining operation is being performed, or an extreme degree of accuracy is not required, I have found it possible to dispense with the hydraulic relay system and employ in its stead a pneumatic relay system as shown in Fig. 6.

Therein I show fluid pressure, such as compressed air, transmitted from the pipe 29 ahead of the orifice 30 to a pilot valve 70 by a pipe 71. The pilot 70 shown in cross-section may be so constructed that downward positioning of the movable valve member 72 permits pressure fluid to be transmitted to one side of the piston 37 and simultaneously exhausts pressure fluid from the opposite side of the piston 37. Conversely upon upward positioning of the member 72 reverse operation of the piston 37 will occur. When the normal distance exists between port 31 and template 19 the member 72 is positioned so that the lands thereon are adjacent the outlet ports leading to the servo-motor 38.

Figure 8:
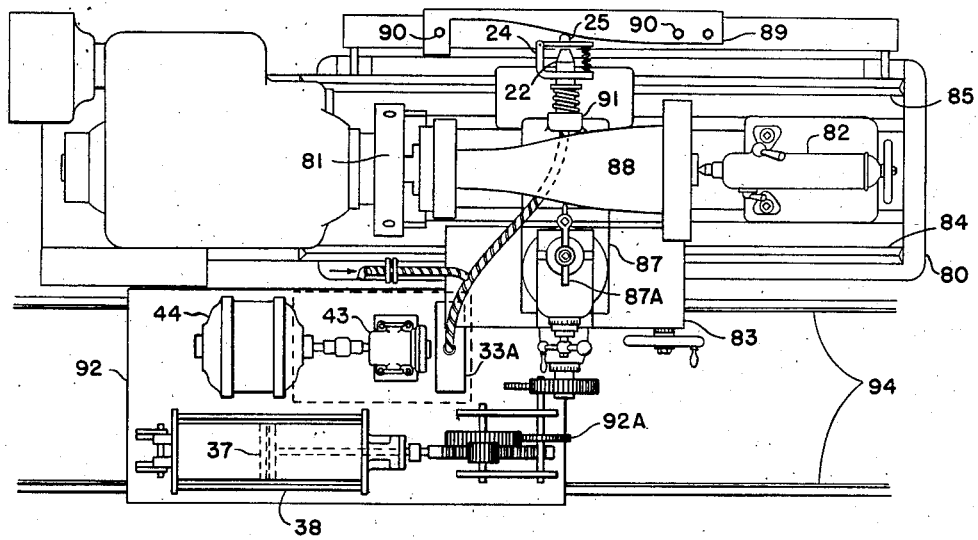
Fig. 7 is a side elevation and Fig. 8 is a plan view of an engine lathe showing the application of my invention thereto.
Figure 7:
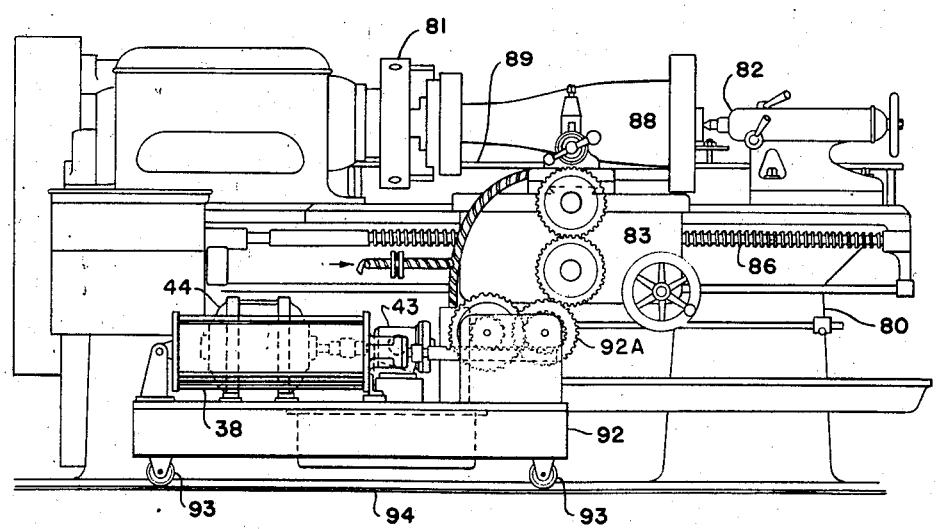

In the embodiments of my invention so far described the work piece has been moved, whereas the cutter or tool has remained stationary. In Figs. 7 and 8 I disclose a further embodiment of my invention in conjunction with an engine lathe wherein the work piece remains in fixed position and the tool, or cutter, is moved. It will be evident to those skilled in the art however that in all of the embodiments it is the relative movement between the work piece and the tool which is of importance and which is controlled by my invention.

Referring to Figs. 7 and 8 I therein show a typical engine lathe having a bed 80, rotatable face plate 81, and tail stock 82. It is further provided with a carriage 83 movable on guideways 84, 85 longitudinally along the bed 80. Normally the longitudinal movement of the carriage is controlled by a feed screw 86, which may be driven by any suitable source of power (not shown) at any desired speed by means of suitable reducing gears (not shown).

Mounted on the carriage 83 is a cross-slide 87 carrying a tool holder and tool 87A which by way of example I have shown as forming a work piece 88 into general irregular conical form. In the embodiment of my invention shown the transverse motion of the cross-slide 87 is automatically controlled so that the work piece 88 is formed to correspond in shape to a template 89, which is secured to the bed 80 of the lathe by suitable clamping means 90.

The system for positioning the tool 87A relative to the work piece 88 is substantially the same as that described for positioning the cutter 3 relative to the work piece 14. Nozzle 22 is resiliently mounted in an arm 91 secured to the cross-slide 87. The projection 25 of the follower 24 bears against the edge of the template 89, which has a contour to which the work piece 88 is to be shaped. Pressures established in the nozzle 22 are transmitted to the relay 33A, which in turn acts to control the positioning of the piston 37 in servo-motor 38. Positioning of the piston 37 controls the transverse positioning of the tool 87 through a rack 39 and suitable gears 92A.

In order that the servo-motor 38, relay 33A and associated apparatus may move with the cross-slide 87 longitudinally along the lathe they are shown mounted on a truck 92 provided with flanged wheels 93 riding on rails 94. The truck 92 is secured to the carriage 83 so that the servo-motor is maintained at proper operating distance from the cross-slide 87.

In operation, as the template 89 changes in shape corresponding variations in pressure within the nozzle 22 occur, which effect transverse operation of the cross-slide 87 to maintain the follower 24 at normal distance from the port 31. Simultaneously, the tool 87 is moved transversely so that the work piece 88 assumes the same shape as the template 89. The cross-slide 87 is moved longitudinally by the feed screw 86 and carriage 83 at desired speed by any suitable source of power as heretofore described.

In the embodiments of my invention illustrated I have shown the lead screw of a machine tool operated by a servo-motor comprising a piston and a cylinder. It is evident that other types of servo-motors may be used such, for example, as hydraulic motors and the like. Because of the positive action and relative simplicity of a piston and cylinder type of servo-motor I find it preferable to use in most instances. The sole disadvantage of this type of servo-motor in the past has been that in those instances where materially great changes in the contour of the template occur, in order to provide corresponding movements of the work piece relative to the tool a cylinder and rack of too great length to be practical was required. I have devised a system, however, whereby a cylinder and rack of desired length may be used regardless of the configuration of the template. Because the novelty of my system does not reside in any particular element, but in the novel cooperation between a combination of elements, I have chosen to illustrate the system schematically.

Figure 9:
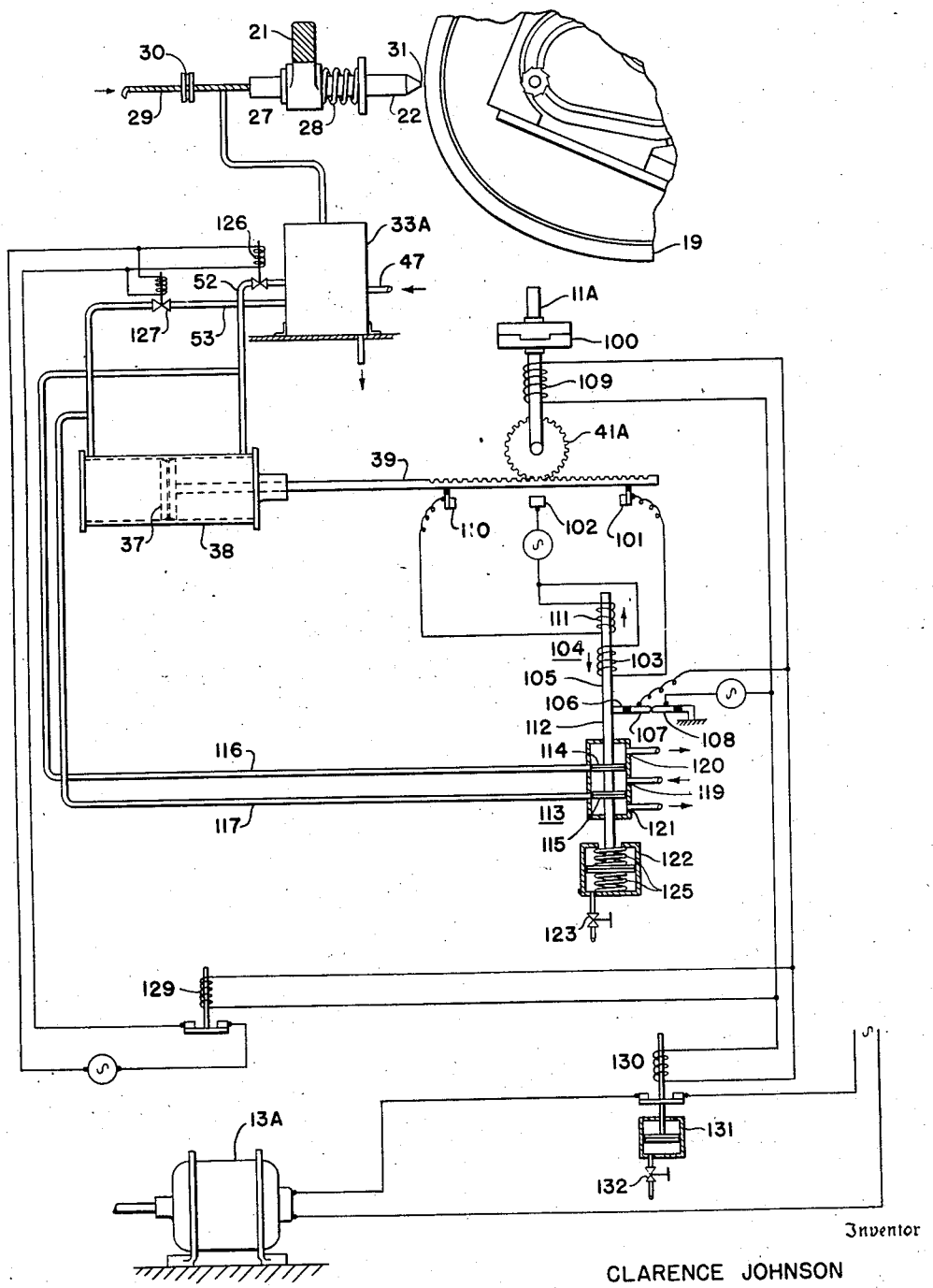
Fig. 9 illustrates a further embodiment of my invention incorporating a modification.

Referring to Fig. 9, I therein show the nozzle 22 and cooperating template 19. It will be evident that if the template 19 has large changes in configuration in order to obtain corresponding changes in relative positions of the work piece and tool, it will be necessary that the lead screw 11A be revolved an exceptionally large number of turns, which ordinarily would require rack 39 and cylinder 38 to be impractically long. In accordance with my invention, however, I employ a rack and cylinder of desired length and when the rack is near the end of its travel in either direction I declutch the lead screw 11A from the gear 41A by means of an electromagnetically operated clutch 100, and simultaneously stop the machine. I then, by means of a high speed reset mechanism, position the piston 37 to or about its mid position. Next, I throw in the clutch 100 and then restart the machine. The operations I have described may be performed entirely automatically so that after the machining operation is once started, it is unnecessary that the operator give it any further attention until the operation is completed.

Describing first the operation whereby the lead screw 11A is declutched from the gear 41A when the rack 39 approaches the end of its travel in one direction, a contact 101 carried by the rack 39 engages a stationary contact 102, thus closing the circuit for the coil 103 of a solenoid 104. The solenoid has a movable armature 105 which is positioned downwardly from its mid or neutral position by energization of the coil 103.

The armature 105 carries a horizontal extension 106 terminating in a contact 107 normally, that is when the coil 103 is not excited, engaging a stationary contact 108. The clutch 100 has a coil 109 which holds the clutch in so that movements of the rack 39 are transmitted to the lead screw 11A. When the coil 109 is deenergized, the clutch 100 is declutched so that regardless of movement of the rack 39, the lead screw 11A remains stationary. As shown, energization of the coil 109 is controlled by contacts 107—108. Thus, upon energization the coil 103 and the armature 105 moving downwardly clutch 100 is opened so that thereafter until contacts 107—108 again engage, the lead screw 11A will remain stationary.

So far as the operation of the clutch 100 is concerned, the same sequence of events occurs upon the rack 39 approaching the end of its travel in opposite direction. In this instance the stationary contact 102 engaging a contact 110 secured to the rack 39 and effecting upward movement of the solenoid 104 due to energization of a coil 111. It will be noted that in this case contacts 107—108 will disengage, thereby deenergizing coil 109 and declutching rack 39 from the lead screw 11A.

The lower end of the armature 105 forms a movable valve member 112 of a pilot valve 113. Carried by the member 112 are lands 114 and 115 normally disposed in a closed position so that hydraulic fluid is neither transmitted to or from pipes 116 and 117. The pilot valve is supplied with oil under pressure from any suitable source (not shown) through an inlet port 119 disposed between lands 114 and 115. The pilot valve also has two exhaust ports 120 and 121.

Pipe 117 leads to pipe 53 connected to the cylinder 38 on one side of piston 37. Pipe 116 is connected to pipe 52, which is connected to cylinder 38 on the opposite side of piston 37.

In normal operation, that is when the clutch 100 permits motion of the rack 39 to be transmitted to the lead screw 11A, the piston 37 is positioned so that the work piece is moved relative to the tool in correspondence with changes in the configuration of the template 19 as heretofore described. During these periods of normal operation, the armature 105 is in the neutral position so that oil is transmitted neither to nor from the pipes 116 and 117. Upon either upward or downward movement of the armature 105 it will be observed, however, that lands 114 and 115 will be displaced from the neutral position thereby permitting hydraulic fluid to be transmitted to one of the pipes 116 or 117 and withdrawn from the other pipe.

In operation upon the contact 101 engaging stationary contact 102, for example, indicating that the rack 39 has reached its approximate travel and in that direction, the armature 105 will move downwardly, thereby connecting inlet port 119 with pipe 117 so that hydraulic fluid will be transmitted to the cylinder 38 and position piston 37 to the right as shown in the drawings so that the rack is restored to a position within its operating range. Simultaneously, with the transmittal of hydraulic fluid to pipe 117, hydraulic fluid will be withdrawn from the opposite side of piston 37 through pipes 52, 116 and exhaust port 120. The operation when the contact 110 engages the stationary contact 102 is similar in this instance to the armature 105 moving upwardly thereby connecting inlet port 119 with pipe 116 so that hydraulic fluid is transmitted to pipe 52 and positioning the rack 39 in opposite direction. Simultaneously, pipe 117 is connected with exhaust port 121 so that hydraulic fluid is withdrawn from pipe 53 and the opposite side of piston 37.

To prevent the armature 105 being restored to the neutral position as soon as disengagement between contact 102 and contact 101 or 110 occurs and, further, to govern the resetting of rack 39, I provide a time delay means, in the drawings shown as a dash pot 122, which may be provided with an adjustable bleed valve 123 to govern the time required for the armature 105 to be repositioned to the neutral position and hence the position to which the piston 37 will be restored after having reached an extreme of travel. Conveniently, the dash pot 122 may be provided with biasing springs 125 to maintain the armature 105 in neutral position during periods of normal operation.

As will be understood by those familiar with the art, I may by proper design of pilot 113 render the relay 33A substantially inoperative during the period of time when the armature 105 is displaced from the mid or neutral position. Thus, I may provide for much greater flows at higher pressures through the pilot 113 so that the operation of the relay 33A has an unappreciable effect upon the positioning of the piston 37 within the cylinder 38. However, I may if desired provide for isolating the relay 33A from the cylinder 38 during periods when the piston 37 is being reset. By way of diagrammatic illustration, I show in pipes 52 and 53 solenoid operated valves 126 and 127 normally energized and in open position so that hydraulic fluid is transmitted freely from the relay 33A to the cylinder 38. The energization of the solenoids 126 and 127 is controlled by a relay 129, the energization of which in turn is controlled by contacts 107—108. Thus as long as contacts 107—108 are closed, the solenoids 126 and 127 are energized. When, however, the armature 105 is displaced from the neutral position, solenoid relay 129 breaks the circuit through solenoid valves 126—127 so that communication between relay 33A and cylinder 38 is stopped. Normal communication will be reestablished when the armature 105 is returned to the neutral position and contacts 107—108 reengage. Thus, if preferable, I may during a reset operation isolate the cylinder 38 so that the piston 37 is controlled solely from pilot 113.

During the reset operation, the machine is preferably stopped to prevent the tool from incorrectly forming the work piece while the clutch 100 is disengaged. To this end I show the motor 13A, driving the machine, as controlled from contacts 107—108. Connected in the motor circuit is a solenoid relay 130 normally energized through contacts 107—108. When these contacts disengage, however, solenoid 130 breaks the circuit to motor 13A. Preferably motor 13A is not restarted until a short increment of time after contacts 107—108 have reengaged. To provide for this I show the solenoid 130 as provided with a dash pot 131 having an adjustable bleed valve 132 so that the delay in restarting the motor 13A after closure of contacts 107—108 may be adjusted. This time delay in restarting motor 13A permits the tool to be accurately adjusted relative to the work piece in the event that such adjustment has been altered during the period of time when the reset operation is taking place.

Figure 10:
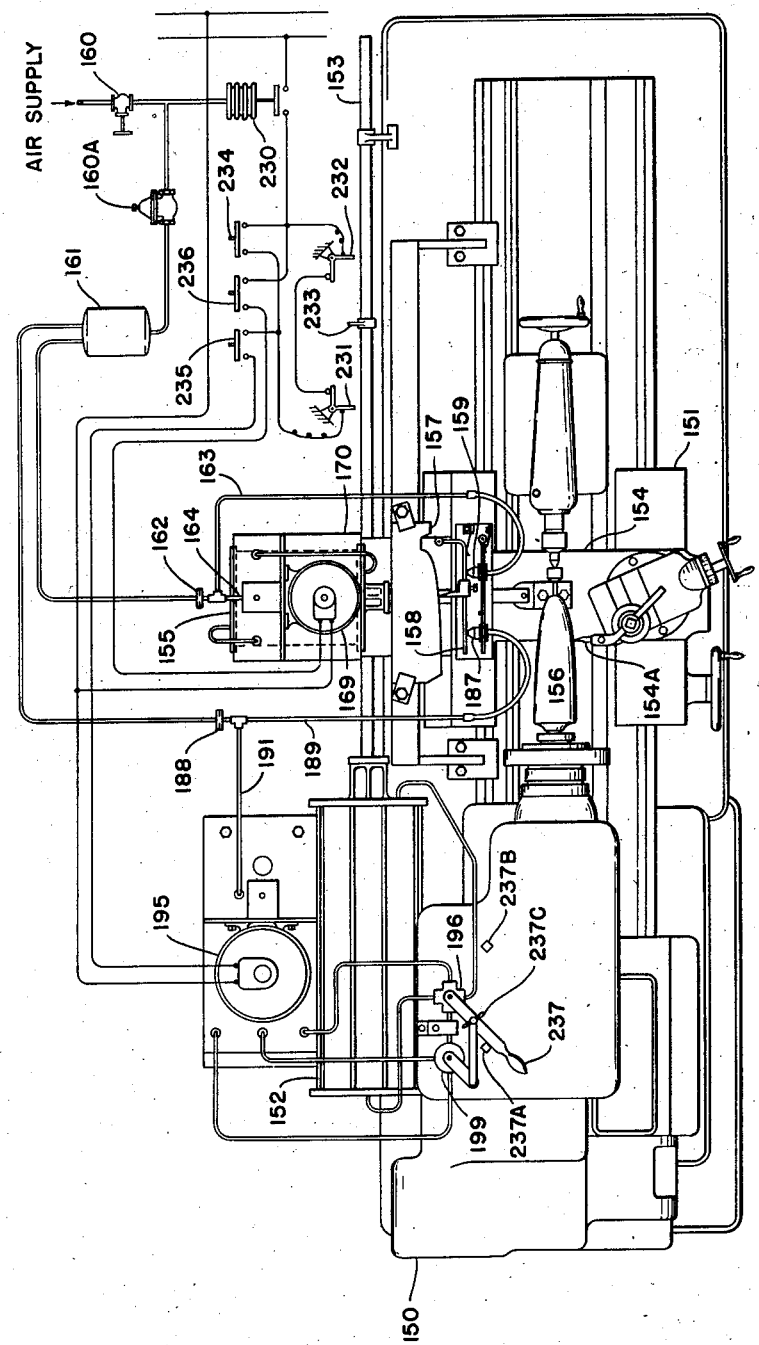
Fig. 10 is a plan view of an engine lathe illustrating the application of a modified form of my invention thereto.
Figure 11:
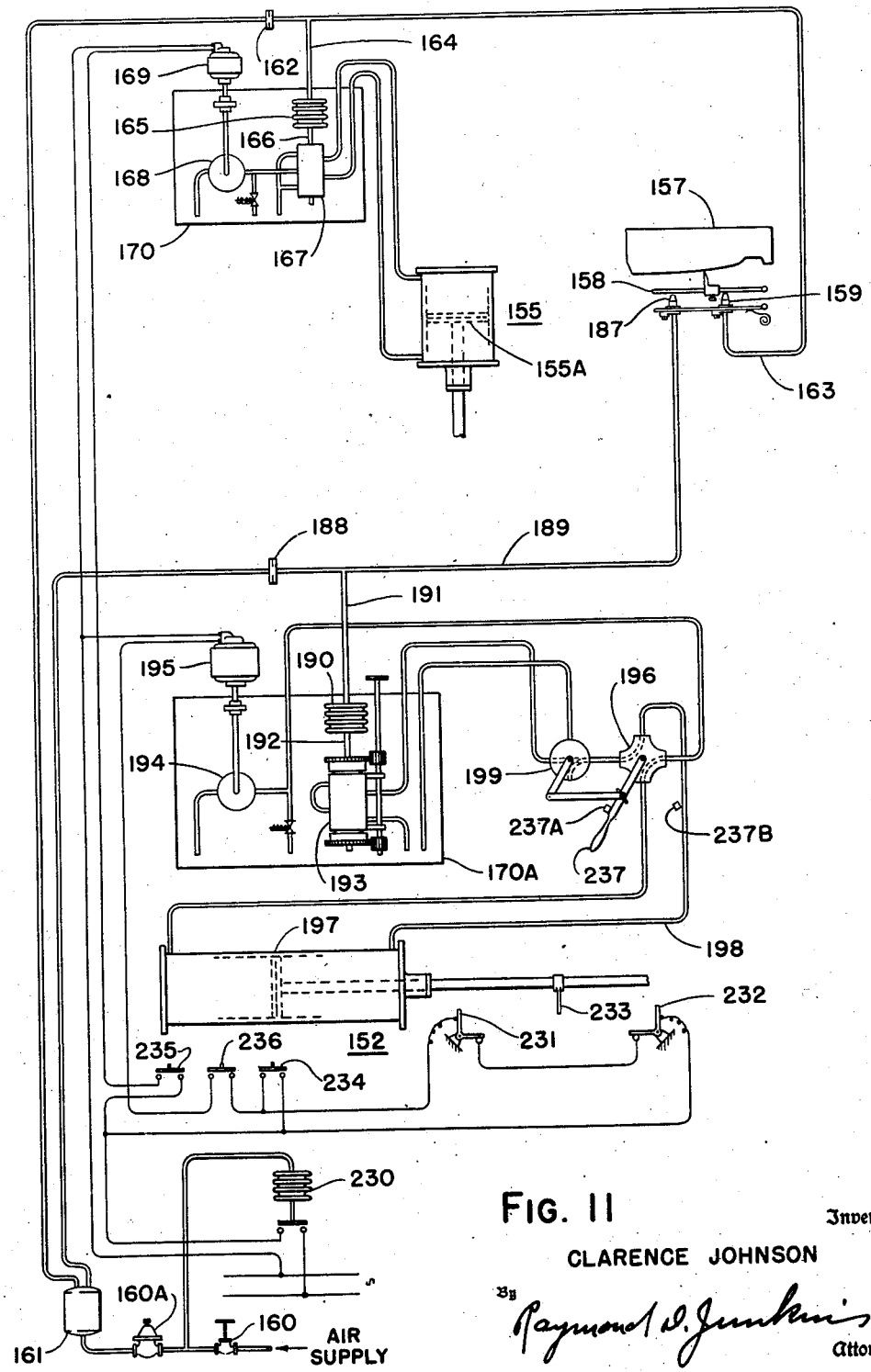
Fig. 11 illustrates diagrammatically the various circuits employed in the embodiment of my invention shown in Fig. 10.

In Fig. 10, I show a modified form of my invention applied to an engine lathe 150 similar to the lathe illustrated in Figs. 7 and 8. In Fig. 11 the control and operating circuits for the embodiment of my invention illustrated in Fig. 10 are shown diagrammatically.

Referring to Figs. 10 and 11 the carriage 151 is arranged to be positioned longitudinally along the lathe 150 by a servo-motor 152 having a piston rod 153 operatively connected to the carriage. A cross-slide 154 mounted on the carriage 151 is positioned transversely by means of a similar servo-motor 155 secured to and movable with the carriage 151. In the embodiment of my invention illustrated in Fig. 10 the tool 154A carried by the cross-slide 154 is positioned to form a work piece 156 to conform with the shape of a pattern or template 157.

As the carriage 151 is positioned along the lathe by the servo-motor 152 transverse changes in the profile of the pattern 157 effect corresponding changes in the relative positions of a pivoted follower or feeler 158 and nozzle 159. The nozzle 159 is supplied with fluid under pressure, such as compressed air, from a source (not shown), through a shut-off valve 160, a reducing valve 160A, a stabilizing volume tank 161 and a suitable resistance such as an orifice 162. As in the embodiments of my invention previously described, compressed air is continuously discharged through the nozzle 159 to the atmosphere and changes in the position of the feeler 158 relative to the nozzle 159 cause changes in the pressure within the pipe 163 connecting the nozzle 159 to the orifice 162. Variations in pressure within the pipe 163 are transmitted through a pipe 164 to an expansible contractible chamber such as a bellows 165 positioning the movable valve member 166 of a pilot valve 167. The pilot valve 167 controls the flow of hydraulic fluid to and from a servo-motor 155.

When the profile of the pattern 157 is parallel to the line of travel of the carriage 151 a certain distance will exist between the nozzle 159 and feeler 158. When this distance, which for convenience I call the "normal distance," exists a sufficient pressure is maintained within the bellows 165 to hold the movable valve member 166 in a neutral position so that hydraulic fluid is transmitted neither to nor from the servo-motor 155 and the cross-slide 154 remains stationary relative to the carriage 151. Assuming, however, by way of example that the feeler 158 moves toward the nozzle 159, the pressure within the pipe 163 and that transmitted to the bellows 165 will increase proportionately. Such increase in pressure will cause the servo-motor 155 to position the cross-slide 154 so that the nozzle 159 carried thereby moves away from the feeler 158 until normal distance is restored therebetween. The tool 154A also carried by the cross-slide 154 will be moved relative to the work piece 156 a corresponding amount, and hence the latter will be formed to the exact configuration of the pattern or template 157.

Figures 12, 13:
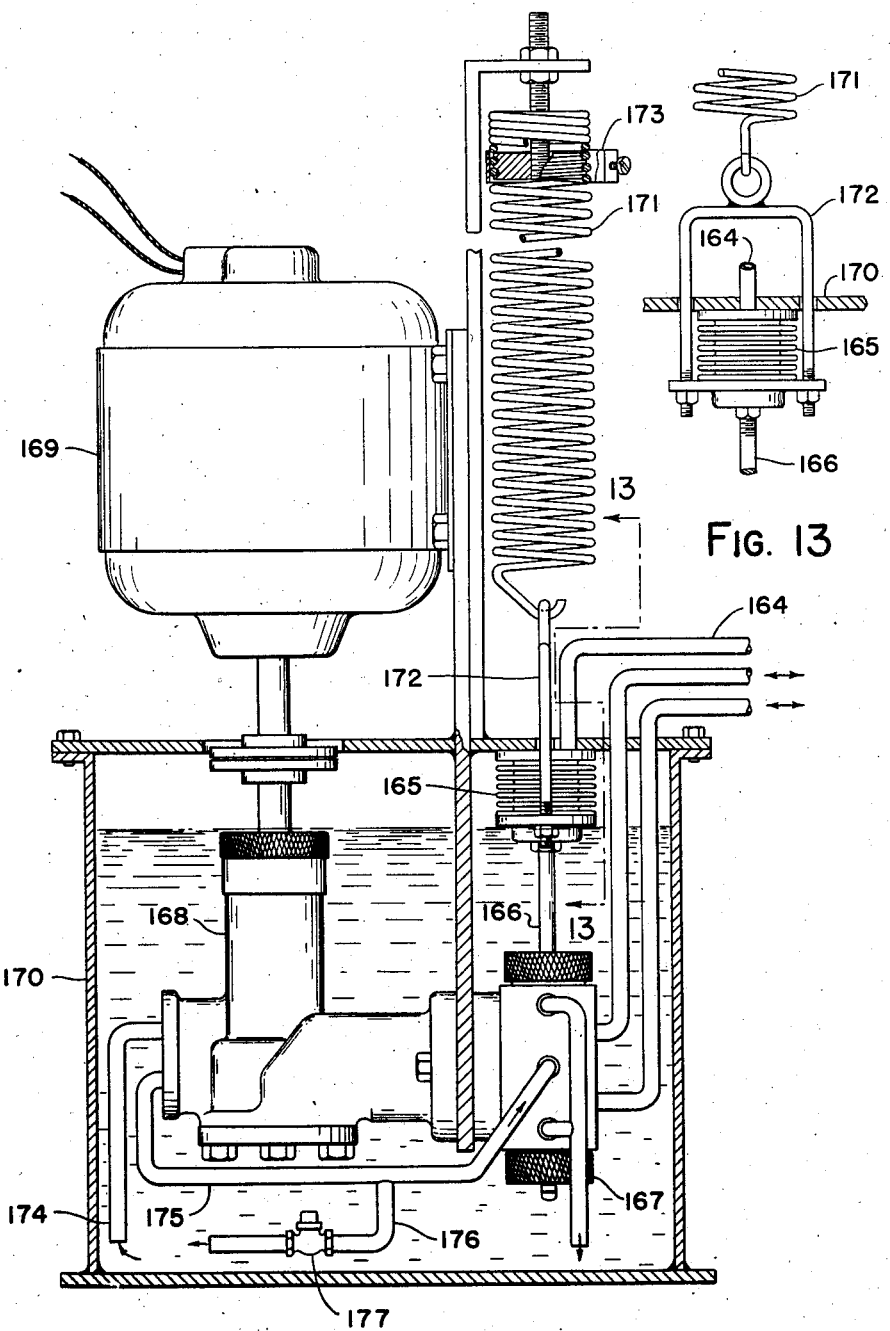
Fig. 12 is a side elevation of a hydraulic power unit.
Fig. 13 is a fragmentary view taken along the line 13—13 of Fig. 12.

Hydraulic fluid, such as oil, is supplied the pilot 167 by means of a pump 168 driven by a motor 169. As shown in Fig. 12, the pilot 167, pump 168 and associated apparatus may be conveniently mounted in a housing 170 forming an oil reservoir. As shown in Figs. 12 and 13, the force produced by the fluid pressure within the bellows 165 is opposed by a coil spring 171 to which it is connected by means of a stirrup 172. The effective length of the spring 171 may be varied by means of an adjustment 173, so that the displacement of the movable valve member 166 from the neutral position for a change in pressure within the bellows 165 of given amount may be varied. As the speed with which the piston 155A of the servo-motor 155 is positioned depends upon the displacement of the movable valve member 166 from the neutral position, it is evident that the adjustment 173 provides a means for varying the speed with which the tool 154A is positioned relative to the work piece 156 for a given change in the relative positions of the feeler 158 and nozzle 159.

Figure 15:
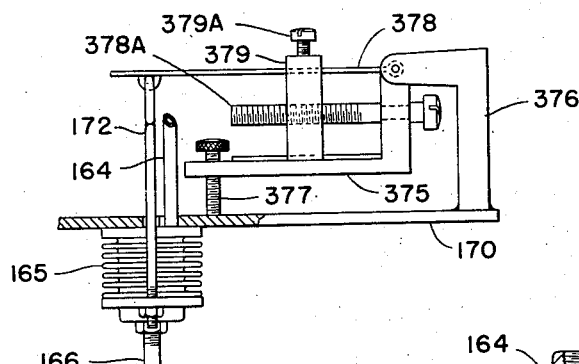
Figs. 15 and 16 are fragmentary views illustrating modifications of certain parts of the power unit shown in Fig. 12.
Figure 16:
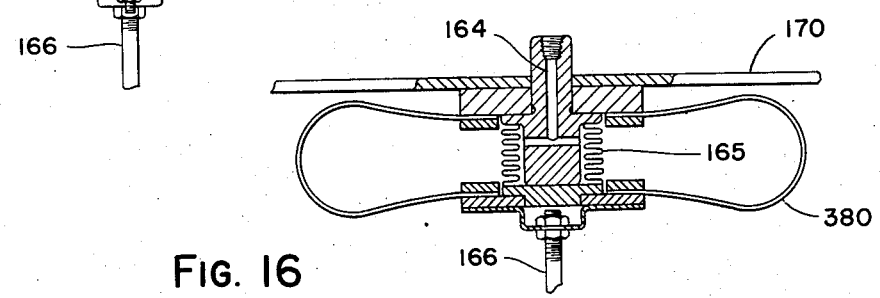

In Figs. 15 and 16 I show further forms of spring and bellows arrangements which may be used in place of the construction shown in Figs. 12 and 13. Referring to Fig. 15, I therein show a bell crank 375 pivotally mounted on a support 376 mounted on the top of housing 170. The bell crank 375 is angularly adjustable about the support 376 by a thumb screw 377. Secured to the bell crank 375 is a leaf spring 378 to which is secured at its free end the stirrup 172. Supported by the bell crank 375 and adjustable therealong by a thumb screw 378A is a movable fulcrum 379 having a clamping means 379A for varying the effective length of the leaf spring 378.

Thumb screw 377 affords a means for adjusting the vertical position of movable valve member 166 so that for the pressure existing within bellows 165 when feeler 158 is at the normal distance from nozzle 159 no fluid will pass from the hydraulic pump 168 to servo-motor 155, and the tool 154A will be locked in a stationary position relative to the carriage 151. A change in position of the fulcrum 379 varies the rate of transverse movement of tool 154A for a given movement of feeler 158 toward or away from the nozzle 159.

Referring to Fig. 16 I show the force produced by fluid pressure within the bellows 165 opposed by an elliptical spring 380 so that movements of the pilot valve member 166 will be proportional to variations in pressure therein. In the construction shown in Fig. 16 the spring 380 is preferably located within the housing 170.

The housing 170 may be mounted, as shown in Fig. 10, directly on the servo-motor 155. This construction provides a compact power unit which may be readily adapted as an attachment to any machine tool, as will be appreciated by those familiar with the art. It is evident, however, that the housing 170 and parts supported thereby may, if desired, be located a considerable distance from the servo-motor 155.

In Fig. 12 I have illustrated a centrifugal pump 168 driven by an electric motor 169. Oil is drawn into the pump 168 from the reservoir formed by the housing 170 through an inlet 174 and is transmitted to the pilot valve 167 through a connection 175. In order that the oil transmitted to the pilot 167 may be maintained at substantially constant pressure a connection 176 is provided in which is located a relief valve 177, which may be adjusted for any desired pressure.

Figures 14, 29:
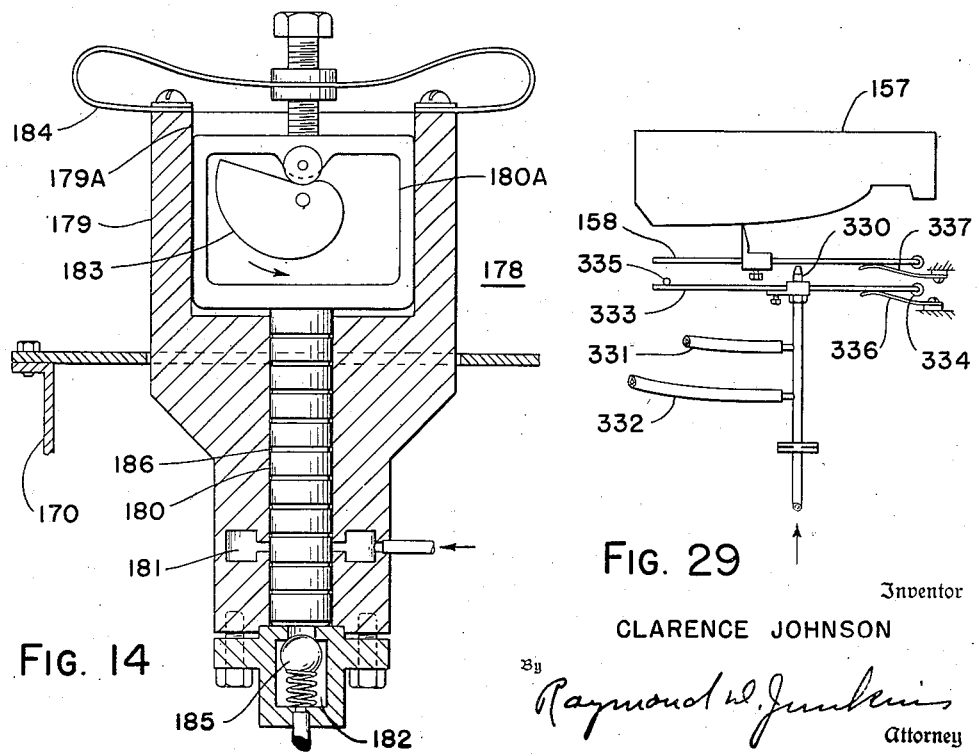
Fig. 14 is an elevation view of a fluid pump which may be employed in the power unit shown in Fig. 12.
Fig. 29 illustrates an alternate arrangement of tracer and nozzle mechanism which may be incorporated in the various embodiments of my invention.

In Fig. 14 I show an alternate form of pump construction which may be used in place of the pump 168. The pump 178 shown in Fig. 14 is particularly adapted to the pumping of small volumes of fluid and has the advantage that only a volume of fluid necessary to maintain the pressure desired is actually pumped, thereby decreasing the power consumption and wear on the moving parts.

Referring to Fig. 14, the pump 178 comprises a housing 179 forming a cylinder in which is disposed a piston 180 having an extension 180A forming a yoke guided in ways 179A. Oil or other fluid to be pumped is drawn into the cylinder through an inlet 181 and discharged through an outlet 182. Cyclically the piston 180 is moved upwardly so that its lower end rises above the inlet 181, by a cam member 183 continuously rotated by any suitable motor means (not shown).

The piston 180 in moving upwardly creates a suction in the cylinder so that upon the inlet 181 being uncovered oil is drawn into the cylinder. The cam 183 is designed so that upon the piston 180 being lifted to the extreme of its upward travel it is released and urged downwardly solely by a spring 184. Acting against the force produced by the spring 184 is the pressure of the oil in the outlet 182, so that the downward travel of the piston will be limited to that necessary to maintain the pressure of the oil in the outlet 182 at the desired value. It is, therefore, evident that the stroke of the piston 180 will vary as required to maintain the oil pressure in the outlet 182 at the desired value.

Disposed in the outlet 182 is a check valve 185 to prevent reverse flow of fluid during the suction stroke of the piston 180. It will be evident that a similar check valve may be provided in the inlet 181 to prevent oil being discharged through the inlet during the pressure or compression stroke. However, as illustrated, I prefer to so locate the inlet port 181 that it is uncovered only when the piston 180 is substantially at its upward extreme of travel so that the piston 180 itself in effect forms a check valve and prevents the discharge of oil through the inlet 181 during its pressure or compression stroke.

The piston 180 is provided with a plurality of circumferential grooves 186 which act to prevent the leakage of oil and also act to prevent undue lateral thrust of the piston against the cylinder wall due to seepage of oil along one side thereof.

Figures 17, 18:
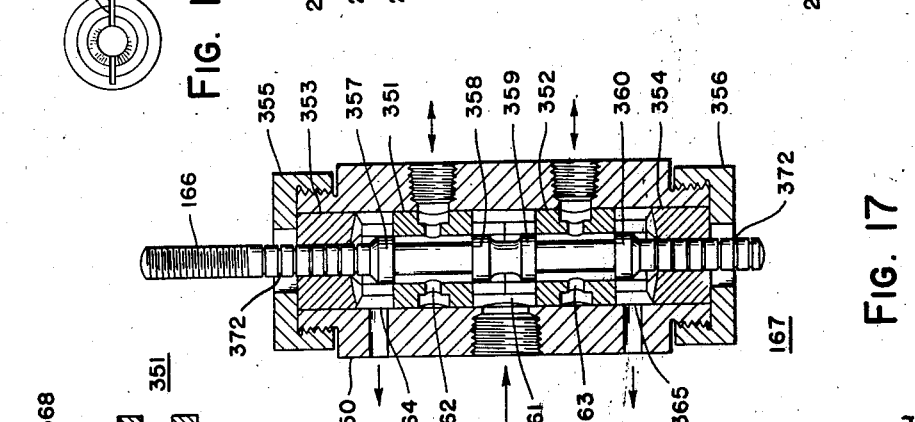
Fig. 17 is a cross-sectional view of one form of pilot valve employed in the power unit illustrated in Fig. 12.
Fig. 18 is an elevation view of a sleeve element of the pilot valve shown in Fig. 17.

In Fig. 17 I show the pilot valve 167 in cross section and to larger size. A body member 350 has a cylindrical bore in which are disposed sleeves 351, 352 and bearing members 353, 354. Caps 355 and 356 screwed to the body 350 hold the sleeves and bearing members in position. The movable valve member 166, positioned by bellows 165, is provided with lands 357, 358, 359 and 360 of slightly less diameter than the bore in sleeves 351, 352. Lands 358, 359 control the flow of hydraulic fluid from an inlet port 361 to outlet ports 362, 363 respectively connected to servo-motor 155. Lands 357, 360 control the flow of hydraulic fluid from outlet ports 362, 363 to waste ports 364, 365 respectively. Downward movement of the valve member 166 from the neutral position in which it is shown opens inlet port 361 to outlet port 362 and permits the passage of hydraulic fluid from the pump 168 to the servo-motor 155. Such movement also opens outlet port 363 to waste port 365 so that as a result of such downward positioning of the valve member 166 hydraulic fluid is admitted to servo-motor 155 on one side of piston 155A and discharged from the other side. Conversely, upward positioning of the movable valve member 166 opens outlet port 363 to inlet port 361, and simultaneously opens outlet port 362 to exhaust port 364. Thus downward positioning of the movable valve member 166 from the neutral position effects operation of piston 155A in one direction, whereas upward positioning effects operation of piston 155A in the opposite direction.

Sleeve 351 which is identical with sleeve 352 is shown to larger size in Fig. 18. The inlet port 361 consists of a slot 366, whereas the outlet port consists of a plurality of circumferentially spaced holes 367. The waste port is similar to the inlet port 366 and comprises a slot 368. The sleeve is also provided with spaced collars 369, 370 serving to properly align the sleeve in the housing 350 and acting to separate the inlet port from the outlet port and the outlet port from the waste port.

Figures 19, 21:
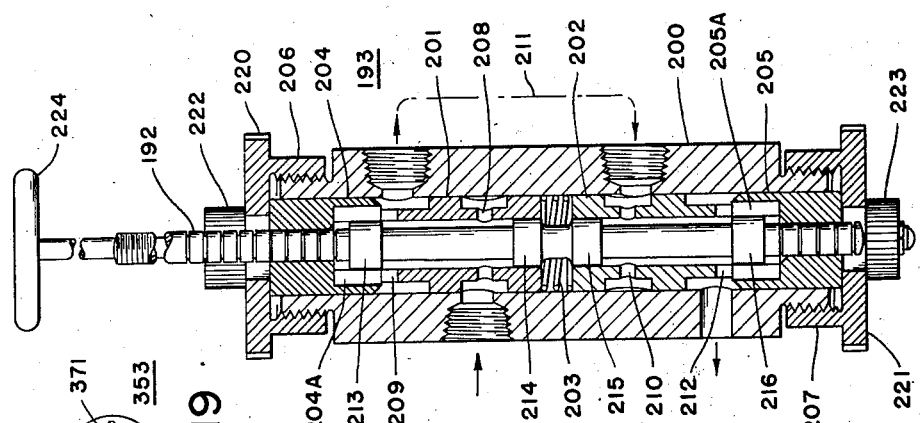
Fig. 19 is an end view of a bearing element of the pilot valve shown in Fig. 17.

In Fig. 19 I show an end view of the bearing member 353, the bearing member 354 being identical therewith. As shown, the end of bearing member 353 adjacent the sleeve 351 is conically recessed and provided with a radial slot 371 which acts to prevent land 357 adhering to the bearing member if positioned upwardly thereagainst.

The pilot valve 167 is inherently stable as a displacement of the valve member 166 from neutral position with consequent flow of hydraulic fluid produces a slight reaction tending to return the movable valve member to the neutral position. That such reaction exists will be evident from an inspection of the construction shown in Fig. 17 for upon a displacement of the member 166 from neutral position the sole unbalanced force is that in the waste port 364 or 365. This stabilizing reaction may be brought to any value desired by proper design of the waste ports. Also by having the valve member 166 journaled in bearing members 353, 354 it is possible to have the lands 357, 358, 359 and 360 of slightly less diameter than the bore through sleeves 351 and 352, thereby reducing friction to a minimum. Further, to reduce friction the sections of the movable valve member 166, journaled in bearing members 353 and 354, are provided with a plurality of grooves 372, thereby preventing pressure building up on one side of the valve member and producing lateral thrust. Such grooves also reduce the leakage which otherwise would exist between the interior and exterior of the pilot valve.

In mechanisms of the type described, it is desirable to modify the rate of relative movement of tool and work piece in one direction whenever a relative movement of the tool and work piece in a second direction is required. Thus in the embodiment of my invention illustrated in Figs. 10 and 11 upon any change in shape of the pattern 157 requiring a transverse movement of the tool 154A the rate of travel of the carriage 151 along the lathe should be decreased so that the shape of the work piece 156 will closely conform to the shape of the pattern. To accomplish this I show the servo-motor 152 controlled by a control couple comprising the feeler 158 and a nozzle 187. So long as the profile of the pattern 157 is parallel to the line of travel of the carriage 151 the normal distance is maintained between the feeler 158 and nozzle 187 so that the servo-motor 152 moves the carriage 151 at any desired maximum rate of speed. However, upon a change in the profile of the pattern 157 the feeler 158 will move toward or away from the nozzle 187, thereby changing the loading pressure established by the latter and acting to slow down the rate of travel of the carriage 151. Thus it may be said that the control couple comprising the feeler 158 and nozzle 187 acts to limit the maximum departure of the work piece 156 from the shape of the pattern 157. Upon a predetermined departure of the relative position of the feeler 158 and nozzle 187 from normal the system disclosed will stop the carriage 151, thereby permitting the tool 154A to be positioned transversely of the axis of the lathe until such normal is reestablished. Preferably and by means hereinafter to be described, the relative positions of the nozzles 159 and 187 are adjustable so that the maximum tolerance between the shape of the work piece 156 and pattern 157 may be brought within any desired limits. Thus the positioning of the nozzle 187 to the left, as shown in Fig. 10, will cause a greater change in air loading pressure for a given change in the profile of pattern 157, and thereby cause a greater change in the rate of travel of the carriage 151.

Referring now particularly to Fig. 11, compressed air is supplied to nozzle 187 through an orifice 188 and pipe 189. Variations in pressure within the pipe 189 caused by changes in the relative positions of feeler 158 and nozzle 187 are transmitted to an expansible contractible bellows 190 through the pipe 191. Changes in pressure within the bellows 190 from that existing when the feeler 158 is the normal distance away from the nozzle 187 acts to position a valve member 192 of the pilot valve 193. The pilot valve 193 may be considered as a variable fluid resistance which acts to increase the resistance to fluid flow upon movement of the valve member 192 upwardly or downwardly from that position existing when the normal pressure is effective within the bellows 190.

The servo-motor 152 is supplied with oil under pressure from a pump 194 driven by a motor 195. Conveniently the motor 194, pilot valve 193 and associated apparatus may be mounted upon and within a housing 170A. This apparatus forms a power unit which is similar in construction and operation to the unit illustrated in Fig. 12.

The oil after leaving the pump 194 passes through a four-way valve 196, and thence to the servo-motor 152 on one side of the piston 197. As the piston 197 is positioned to the right, as shown in Fig. 11, by the oil from the pump 194, oil is discharged from the servo-motor 152 through a conduit 198, the four-way valve 196, thence through a three-way valve 199 to the pilot valve or variable resistance 193, whence it is discharged into the reservoir formed by the housing 170A. It will be noted that the full pressure developed by the pump 194 is effective for positioning the piston 197. The rate of travel thereof and accordingly of the carriage 151 is varied, however, by variably throttling the discharge of oil by means of the pilot valve or fluid resistance 193.

Figure 20:
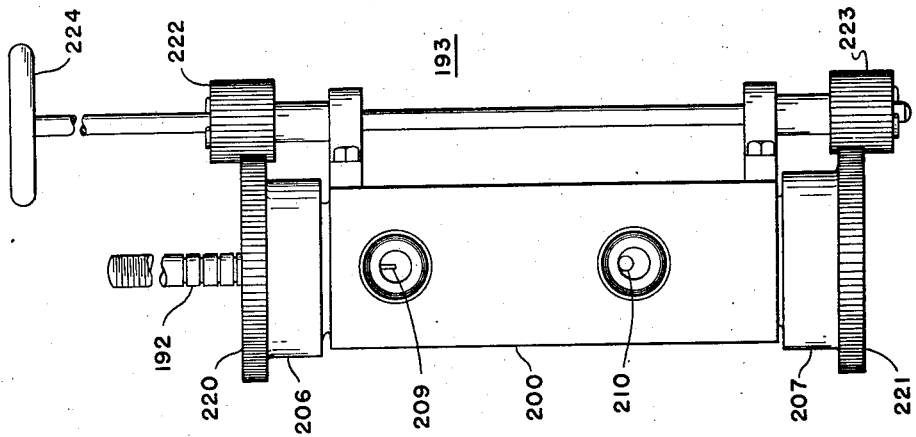
Fig. 20 is an elevation view and Fig. 21 a cross-section view of another form of pilot valve which may be incorporated in the power unit shown in Fig. 12 when used for certain purposes.

In Figs. 20 and 21 I show the pilot valve 193 in greater detail and to larger size. A housing 200 has a longitudinal passageway in which are disposed identical sleeves 201, 202 urged by a spring 203 against bearing members 204 and 205. Caps 206, 207 screw-threaded to the body 193 take the end thrust of the bearing members. Oil exhausted from the servo-motor 152 enters an initial inlet port 208, passes axially upwardly through an intermediate outlet port 209, whence it is transmitted to an intermediate inlet port 210 through a suitable connection (diagrammatically shown) 211, and thence axially downwardly to a final outlet port 212 from which it is exhausted into the oil reservoir.

Within the passageway is disposed the movable valve member 192 having lands 213, 214, 215 and 216. In the position shown the resistance to fluid flow through the port 209 is at a minimum, as is that through the port 212. Accordingly, the piston 197 and carriage 151 will be positioned at maximum speed. Upon the valve member 192 moving downwardly, due to an increase in pressure within the bellows 190, the resistance to fluid flow through the outlet port 209 will increase inasmuch as the land 213 will partially close it. This increase in resistance will decrease the flow of fluid from the servo-motor 152, thereby decreasing the rate of travel of the piston 197. If the pressure within the bellows 190 increases sufficiently so that the land 213 completely covers the port 209 the piston 197 will completely stop. Likewise upward movement of the movable valve member 192 from the position shown will cause the land 216 to partially or wholly cover the port 212, thereby increasing the resistance to fluid flow and slowing down or stopping the piston 197. It is apparent, therefore, that when the pressure within the bellows 190 is that produced when the feeler 158 is a normal distance from the nozzle 187, the piston 197 will travel at maximum speed, and an increase or decrease in fluid pressure within the bellows 190 caused by a movement of the feeler 158 toward or away from the nozzle 187 will cause the piston 197 to slow down or completely stop if such movement is of sufficient magnitude.

The inlet ports 208 and 210 comprise a plurality of circumferentially spaced holes in the sleeves 201 and 202 respectively. The sleeves are recessed adjacent these ports so that oil flows into the passageway formed by the sleeves through all of the holes simultaneously. The outlet ports 209, 212 are formed by end slots in the sleeves 201 and 202. Bearing members 204, 205 are provided with one or more slots 204A, 205A which act to equalize the pressures on opposite sides of lands 213, 216. Slots 204A, 205A having a small area offer a high resistance to the flow of oil.

As will be appreciated by those familiar with the art, it is desirable to have the maximum rate of travel of the carriage 151 adjustable, depending for example upon the contour of the pattern or template 157, the character of the material being machined, etc. Accordingly, I provide the pilot valve 193 with a means for adjusting the minimum resistance to fluid flow. This I accomplish by providing the caps 206 and 207 with opposite threads, so that as they are rotated in the same direction one will move downwardly and the other upwardly. Such positioning will move the bearing members 204, 205 toward or away from each other, causing sleeve members 201 and 202 to likewise move toward or away from each other. Such positioning of the sleeve members will cause the movable valve member 192 to increase or decrease the effective free area of the ports 209, 212 when in the neutral position or that position obtaining when normal distance exists between the nozzle 187 and feeler 158. Conveniently such adjustment may be obtained by providing the caps 206 and 207 with gears 220, 221 meshing with pinions 222, 223 manually rotatable by means of knob 224.

In the embodiment of my invention shown in Figs. 10 and 11, I provide various safety and other devices for facilitating operation. Thus I show connected in the power supply to motors 169, 195 an air pressure failure switch 230 which prevents their operation unless air pressure is available for the nozzles 159, 187. Also shown connected in circuit with motor 195 are limit switches 231 and 232 arranged to be operated by a projection 233 carried by the piston rod of servo-motor 152. The switches may be adjusted so that upon the tool reaching either end of pattern 157 motor 195 is deenergized, thereby preventing further travel of the carriage which might result in damage to the tool or other parts of the lathe. A push button station 234 allows the operator to reenergize motor 195 after the power supply thereto is broken either at switch 231 or 232. Also connected in circuit with motors 169 and 195 are manually operable push buttons 235 and 236 respectively, which affords the operator instantaneous control over the transverse or longitudinal feed of the tool 154A.

As shown in Fig. 10 the tool 154A is arranged to traverse the work piece 156 from left to right. Upon the tool reaching the end of the work piece motor 195 will be deenergized as heretofore described by switch 232 opening. The tool 154A can then be moved transversely away from the work piece 156 by the nozzle 159 and feeler 158 being manually moved relative to each other, thereby causing the servo-motor 155 to position the cross-slide in proper direction. In order that the tool 154A may be returned to the left end of its travel I provide a hand operable lever 237 for simultaneously operating the four-way valve 196 and three-way valve 199. Thus upon the tool 154A reaching the right end of its travel, switch 231 will open, deenergizing motor 195. The operator would then relatively move feeler 158 and nozzle 159 so that the tool is positioned away from the work. Lever 237 would then be shifted from stop 237A to 237B and simultaneously the circuit to motor 195 closed by means of push button 234. Shifting of lever 237, as shown in Fig. 11, causes pipe 198 to be connected to pump 194 while the connection to servo-motor 152 at the opposite side of piston 197 is connected directly to the oil reservoir formed by housing 170A through three-way valve 199. As full pressure developed by the pump 194 is available for positioning the piston 197 in reverse direction, and by virtue of the fact that the pilot valve 193 is by-passed, the reverse traverse will be made at a high speed.

In the event that it is desired to have the tool 154A feed in the reverse direction, that is from left to right, then by disconnecting the lever 237 at 237C from the three-way valve 199 so that movement of the lever adjusts only the four-way valve 196, then the pump 194 will deliver pressure fluid through the pipe 198 to the servo-motor 152, whereas the cylinder of servo-motor 152 on the opposite side of piston 197 will be connected to the pilot valve 193. Accordingly, with such an arrangement the operation will be as previously described, except that the tool 154A will feed from right to left as viewed in Fig. 10 rather than from left to right.

Figure 22:
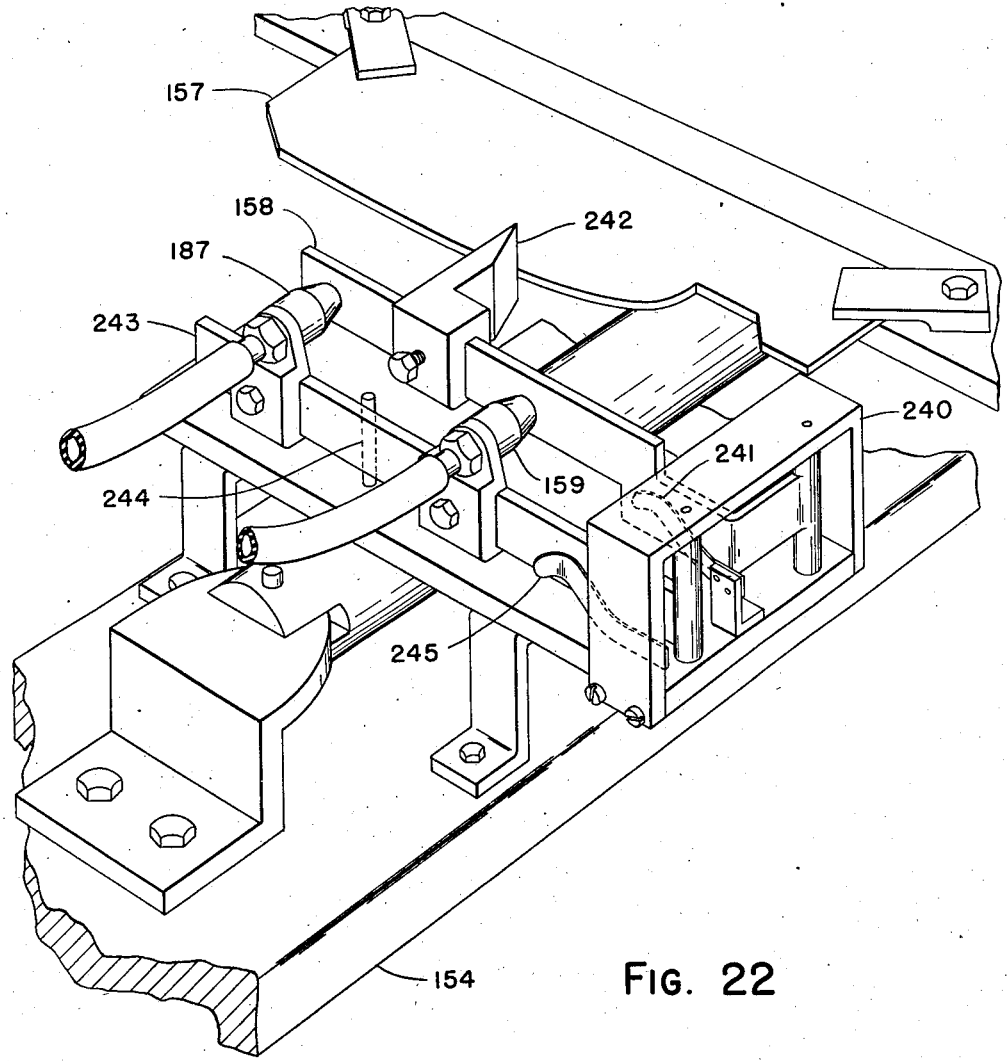
Fig. 22 illustrates to larger size and in greater detail the tracer mechanism shown in Fig. 10.

In Fig. 22 I show to larger size and in greater detail the tracer mechanism illustrated in somewhat diagrammatic fashion in Fig. 10 as being comprised essentially of the feeler 158 and nozzles 159 and 187. Referring to Fig. 22, the feeler 158 is pivotally mounted in a bracket 240 supported on the cross-slide 154. The feeler is urged in a clockwise direction by a spring 241 and carries a projection 242 of essentially the same shape as the tool 154A, which bears against the pattern 157. Nozzles 159 and 187 are adjustably mounted on a bar 243 pivotally mounted in bracket 240, and urged against a stop 244 by a spring 245. Transverse depressions in the pattern or template 157 cause the feeler 158 to move away from the nozzles 159 and 187, whereas transverse risers therein cause the feeler 158 to move toward the nozzles 159 and 187.

By having the nozzles 159 and 187 adjustable, the speed with which the carriage 151 is positioned longitudinally along the lathe or the cross-slide 154 transversely thereof may be varied. Likewise having the nozzle 187 adjustable relative to the nozzle 159 permits the transverse speed of the cross-slide 154 to be varied relative to the longitudinal speed thereof. Such adjustment affords a ready means for conforming the operation of the tool to the profile of the particular pattern or template to be duplicated.

Figure 23:
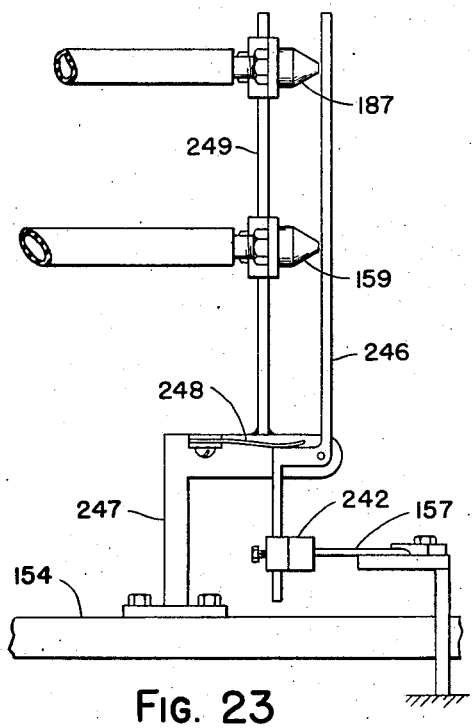
Fig. 23 illustrates a modified form of tracer mechanism.

In Fig. 23 I illustrate a modified form of tracer mechanism wherein a feeler 246 is pivotally mounted on a support 247 secured to the cross-slide 154. The feeler 246 is urged in a counter-clockwise direction by a spring 248 so that the projection 242 bears against the pattern 157. Variations in the shape of the pattern 157 cause the feeler 246 to move toward or away from the nozzles 159 and 187, which control the operation of the carriage 151 and cross-slide 154 as heretofore described. The nozzles 159 and 187 are adjustably mounted on a vertical support 249 so that the longitudinal and transverse speeds of the tool 154A may be relatively varied.

Figure 24:
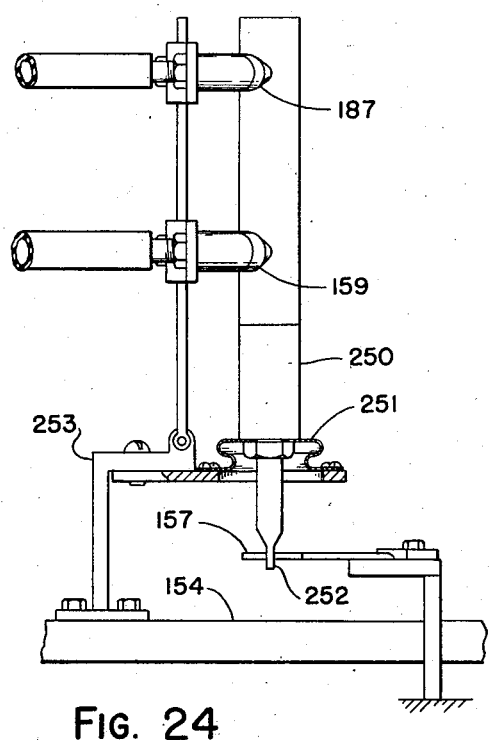
Figs. 24 and 25 are elevation and plan views respectively of another form of tracer mechanism.
Figure 25:
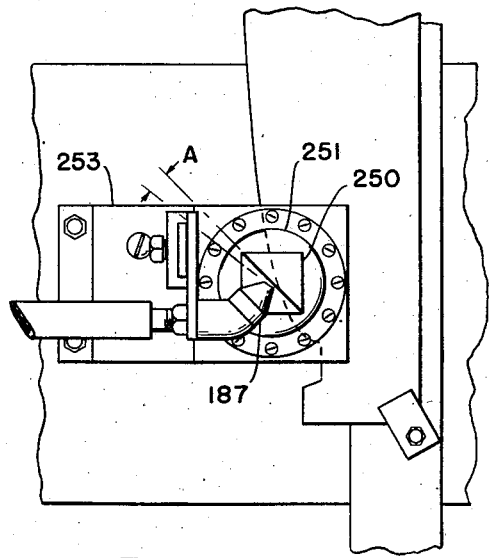

In Fig. 24 I show in elevation and in Fig. 25 in plan view a further modified form of tracer mechanism. Therein a feeler 250 is vertically mounted in a flexible diaphragm 251 and has a projection 252 adapted to bear against the pattern 157. The diaphragm 251 is secured to a support 253 mounted on the cross-slide 154. As the projection 252 is oscillated in any direction in following the contour of the cam 157 the feeler 250 is correspondingly oscillated toward or away from the nozzles 159, 187, thereby controlling the movement of the tool 154A as heretofore described. Preferably the face of the feeler 250 adjacent the nozzles 159 and 187 is disposed at an angle to the longitudinal and transverse motion of the cross-slide 154 as shown more clearly in Fig. 25. Likewise the face of the feeler 250 lies in a plane at an angle to the plane of the nozzles 159, 187 as indicated by A in Fig. 25. Such construction permits the feeler 250 to accurately control the operation of the cross-slide notwithstanding that the pattern 157 has a profile edge at right angles to the longitudinal axis of the lathe. In other words, the construction shown makes it possible for the feeler 250 to move toward or away from the nozzles 159 and 187 when the projection 252 is moving at right angles to the line of movement of the carriage 151 in following the profile of the pattern.

Initially, with the tracer construction shown in Figs. 24 and 25, the feeler 250 is adjusted relative to the nozzles 159 and 187 so that the inherent resiliency of the flexible diaphragm 251 urges the extension 252 toward the pattern. Upon the projection 252 reaching a declivity in the pattern the tracer 250 will move toward the nozzles 159 and 187, whereas upon the extension 252 meeting a projection the tracer 250 will move away from the nozzles 159 and 187.

Figure 26:
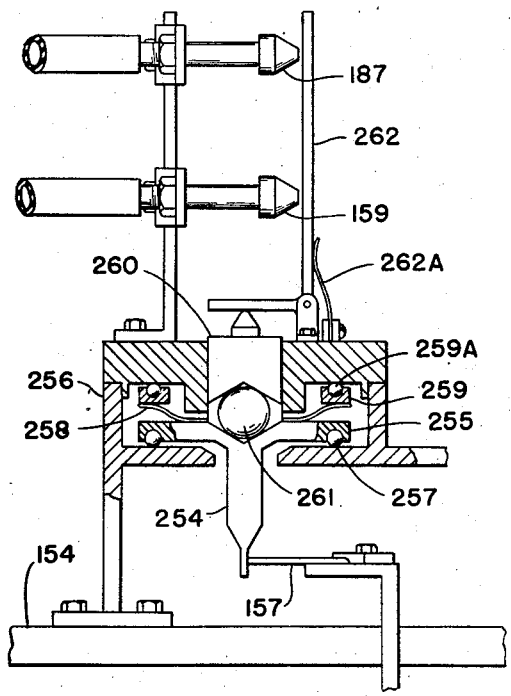
Fig. 26 illustrates a further modified form of tracer mechanism.

In Fig. 26 I show a further modified form of tracer mechanism. In this construction a feeler 254 engages the pattern 157 and has a laterally extending flange 255 disposed within a housing 256. The flange 255 has a circular groove forming a ball race in which are disposed ball bearings 257. The flange 255 is urged downwardly against the lower face of the housing by spring members 258 carrying at their outer extremities a ball race 259 carrying ball bearings 259A bearing against the upper face of the housing 256.

The feeler 254 is movable in any direction in a horizontal plane by changes in the profile of the pattern 157. Such horizontal movements are translated into corresponding vertical movements of a plunger 260 through a ball 261 disposed in mating conical recesses in the feeler 254 and plunger 260. Vertical movements of the plunger 260 oscillate a bell crank 262 toward and away from the nozzles 159 and 187 to thereby control the longitudinal and transverse movements of the tool 154A.

The tracer mechanism shown in Fig. 26 is initially adjusted so that the apex of the conical recess in the feeler 254 is offset from the apex of the conical recess in the plunger 260 when normal distance exists between the nozzles 159, 187 and bell crank 262. The apexes of the two conical recesses are urged toward alignment however by a spring 262A bearing against the bell crank 262. Such downward urging of the plunger 260 also urges the feeler 254 against the pattern 157, so that a declivity in the pattern causes the bell crank 262, for example, to approach the nozzles 159 and 187, whereas a projection causes it to recede therefrom.

Figure 27:
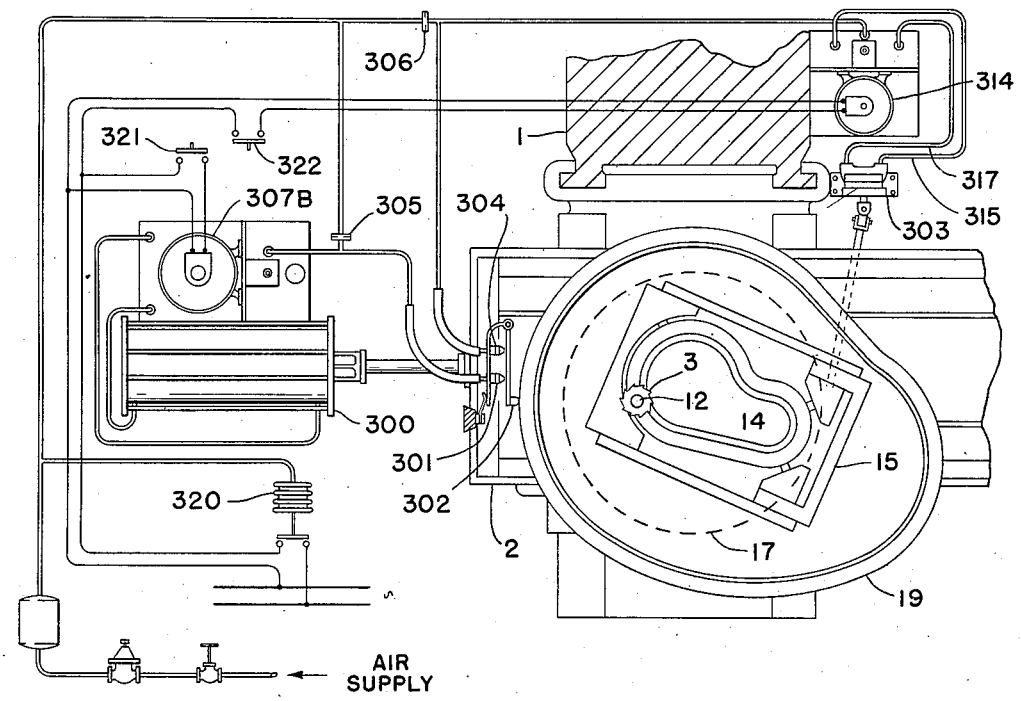
Fig. 27 is a plan view of the modified form of my invention shown in Fig. 10 applied to a milling machine as shown in Figs. 1 and 2.
Figure 28:
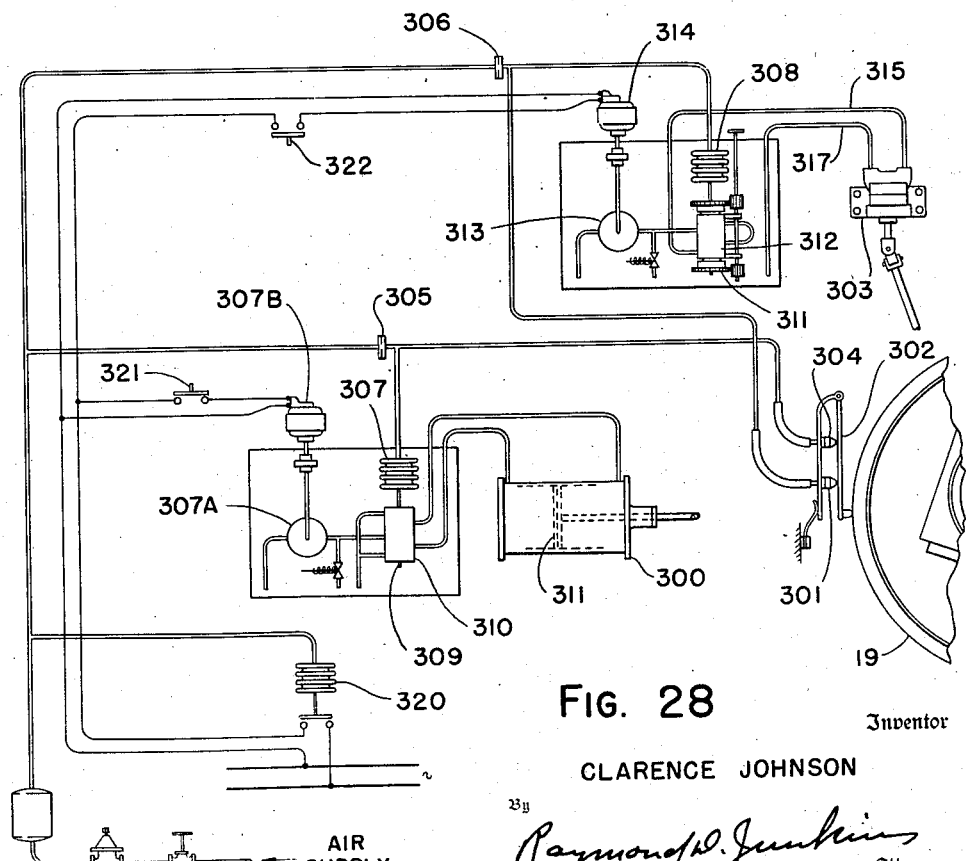
Fig. 28 is a diagrammatic view of the circuits employed in the embodiment of my invention shown in Fig. 27.

In Fig. 27 I show in plan view a milling machine such as illustrated in Figs. 1, 2 and 3, wherein I control both the positioning of the work table 2 and rotative speed of the circular table 17. In Fig. 28 I show diagrammatically the circuits employed. In this embodiment of my invention so long as the template 19 is circular, or substantially so, the circular table 17 rotates at a predetermined maximum speed. However, upon a change in shape of the template 19 the speed of rotation of the circular table 17 is decreased in order that the tool will machine the work piece 14 to conform to the template 19 within desired tolerances.

Referring to Figs. 27 and 28 the work table 2 is positioned by a servo-motor 300 controlled by changes in the relative positions of a nozzle 301 and feeler 302. The speed of rotation of the circular table 17 is controlled by a servo-motor 303 controlled by changes in the relative positions of a nozzle 304 and the feeler 302.

Referring now in particular to Fig. 28, compressed air is supplied the nozzles 301 and 304 from any suitable source through suitable orifices or other restrictions 305 and 306. Movement of feeler 302 toward nozzles 301, 304 resulting from a radial change in contour of template 19 causes an increase in pressure within bellows 307 and 308. The increase in pressure within bellows 307 positions the movable member 309 of a pilot valve 310 causing the piston 311 within the servo-motor 300 to position the work table 2 in a direction to restore normal distance between the nozzle 301 and feeler 302. The bellows 307, pilot 310, pump 307A, and motor 307B for driving the same may be incorporated in a power unit, such as illustrated and described with reference to Fig. 12.

Movements of the feeler 30 toward and away from the nozzle 304 cause a corresponding increase or decrease in pressure within bellows 308, which serves to position a movable valve member 311 of a pilot valve 312. The pilot valve 312 forms a fluid resistance and is similar to that illustrated and described with reference to Figs. 20 and 21. The pilot valve 312 is supplied with hydraulic fluid under pressure from a pump 313 driven by an electric motor 314. The hydraulic fluid after passing through the variable resistance of pilot 312 is transmitted through a pipe 315 to the servo-motor 303 illustrated as being a centrifugal hydraulic motor. The hydraulic fluid discharged from the motor 303 is transmitted through a pipe 317 to the fluid reservoir from which pump 313 draws fluid. The bellows 308, pilot 312, pump 313, and motor 314, and associated apparatus may be incorporated in a power unit, such as illustrated in Fig. 12, modified by the fact that a pilot valve such as illustrated in Fig. 21 is substituted for the pilot valve 167.

A variation in pressure within bellows 308 from that existing when normal distance exists between feeler 302 and nozzle 304 causes the valve member 311 to move upwardly or downwardly, thereby increasing the resistance to fluid flow through the pilot 312 causing the motor 303 to slow down. The decrease in rate of rotation of motor 303 from normal will, as heretofore described, be proportional to the change in shape of the template 19, and upon a relatively great change in shape will actually cause the hydraulic motor 303 to stop while the cutter 3 and work table 2 are relatively moved. As heretofore described, the nozzles 301 and 304 are desirably adjustable relative to each other, so that the particular change in speed of rotation of the circular table 17 caused by a given change in shape of template 19 may be such as to produce a finished work piece corresponding to the template or pattern within any desired tolerances.

The control system diagrammatically illustrated in Fig. 28 may be provided with suitable interlocks. For example, I show in the power supply to the motors 307B and 314 a pressure switch 320 which prevents operation of the motors until air pressure is available at nozzles 301 and 304. Likewise suitable push button switches, such as shown at 321 and 322, may be provided to afford an operator individual control over the motors 307B and 314 respectively.

In the embodiments of my invention so far described, wherein I control the relative movements of tool and work piece along two related paths, I have provided a separate nozzle for controlling the movement along each path. As I have pointed out, such construction affords a maximum flexibility in that the mechanism is readily adjustable so that the work piece may be made to conform to the pattern or template within any desired tolerances. In some instances however, it may be preferable to employ a single nozzle which will control the relative movements of the tool and work piece along the two related paths simultaneously, and in Fig. 29 I show such a construction which may be incorporated in the various embodiments of my invention I have shown and described.

Referring to Fig. 29, the feeler 158 is arranged to traverse the pattern 157 as the tool 154A, for example, traverses the work piece 156. Movements of the feeler 158 toward and away from a nozzle 330 through which air is continuously discharged to the atmosphere, produce corresponding variations in pressure in the pipes 331 and 332. As described with reference to the embodiment of my invention illustrated in Fig. 10, for example, pressure variations in the pipe 332 may control the servo-motor 152 regulating the rate of travel of the carriage 151, and variations in pressure within pipe 331 may control the servo-motor 155 regulating transverse movements of the cross-slide 154. It will be evident to those familiar with the art that the modification shown in Fig. 29 may equally as well be applied to the embodiment of my invention shown in Figs. 27 and 28.

The nozzle 330 is shown as being adjustable along a bar 333 pivoted at 334 and urged against a suitable stop 335 by a spring 336. The feeler 158 is likewise urged toward the pattern 157 by a spring 337. Such adjustment makes it possible to vary the change in longitudinal rate of travel and simultaneously the transverse feed of the tool for a given change in shape of pattern 157.

This application is a continuation-in-part of my copending application Serial No. 298,290 filed in the United States Patent Office on October 6, 1939, now Patent No. 2,259,472, dated October 21, 1941.

Certain features of my invention, disclosed but not claimed herein, are disclosed and claimed in my copending divisional applications Serial Nos. 491,162, 491,239½, 531,549 and my continuation-in-part application Serial No. 564,225.

While in accordance with the patent statutes I have described certain embodiments of my invention it is evident that such embodiments may be modified in many ways without departing from the spirit and scope of the invention. Such embodiments of my invention as I have chosen to describe should therefore be taken as merely illustrative and not as limiting.

What I claim as new, and desire to secure by Letters Patent of the United States, is:

1. In a metal forming machine having a relatively movable tool and work piece, a first motor means for relatively moving the tool and work piece transversely, a second motor means for relatively moving the tool and work piece longitudinally, a pattern having the desired shape of the work piece, a tracer mechanism including a fluid jet of normally constant pressure for traversing the pattern as the tool traverses the work, means operated by variations created in said tracer jet pressure for controlling the operation of said first motor means, and a separate means operated by variations in said tracer jet pressure for controlling the operation of said second motor means.

2. In a metal forming machine having a relatively movable tool and work piece, a plurality of motors for effecting relative movements of said tool and work piece simultaneously in angularly related paths, a pattern having the desired shape of the work piece, a tracer mechanism including a fluid jet of normally constant pressure for traversing the pattern as the tool traverses the work, and a separate means operated by variations created in the normally constant pressure of said tracer jet for controlling each of said motors independently of the other.

3. In a metal forming machine having a relatively movable tool and work piece, a first motor means for effecting relative movement of said tool and work piece in one direction, a second motor means for effecting relative movement of said tool and work piece in a second direction, a separate means for controlling each of said motor means, each said means comprising a port to atmosphere through which fluid is passed at a constant pressure from a pressure supply, a pattern having the desired shape of the work piece, a tracer mechanism for traversing the pattern, means operated by said tracer against which the said fluid ports discharge for simultaneously controlling the rate at which fluid is passed through said ports.

4. In a metal forming machine having a relatively movable tool and work piece, a first motor means for effecting relative movement of said tool and work piece in one direction, means for controlling said first motor means comprising a port to atmosphere through which fluid is continuously passed, the rate of discharge of fluid from said port controlling the rate of operation of said motor means, a second motor means for effecting relative movement of said tool and work piece in a second direction, means for controlling said second motor means comprising a second port to atmosphere through which fluid is continuously passed, the rate of discharge of fluid from said second port controlling the rate of operation of said second motor means, and means including a pattern and a tracer for traversing said pattern against which said ports discharge for simultaneously controlling the rate of discharge through both said ports to thereby produce relative movement of said tool and work piece in a desired direction.

5. In a duplicator for use with metal forming machines having a tool and a work piece relatively movable in two directions, a tracer means including a plurality of jets normally discharging fluid to atmosphere at a constant pressure, means against which said jets discharge including a pattern for varying said normally constant pressure, said change in pressure acting to vary the rate of relative movement between the tool and work piece in the two directions, and adjustable means for varying the rate of relative movement of the tool and work piece in one direction for a given rate of relative movement in the other direction.

6. In a metal forming machine having a tool and work piece relatively movable in two directions, and including a fluid control system means including jets normally discharging fluid at a constant volume to atmosphere, means for varying the rate of discharge of said jets whereby a change of pressure is created in said system for producing relative movement between the tool and work piece in each of said directions, and means for slowing down the rate of movement in one direction in direct proportion to increases in the rate of movement in the other direction.

7. In a metal forming machine having a relatively movable tool and work piece, a first hydraulic motor for causing the tool to traverse the work piece in a direction parallel to the work piece, a second hydraulic motor for causing the tool to transversely vary its position relative to the work piece, a tracer mechanism including a fluid jet of normally constant pressure mounted in fixed relation to the tool, a pattern mounted in fixed relation to the work piece, said tracer mechanism arranged to traverse the pattern as the tool traverses the work piece whereby the said normally constant pressure fluid jet is subjected to variations in pressure, a first control device operated by said tracer mechanism for varying the rate of operation of said first hydraulic motor in inverse proportion to the deviation of the pattern shape from a direction parallel to the work piece, and a second control device operated by said tracer mechanism independently of said first control device for varying the rate of operation of said second hydraulic motor in direct proportion to the deviation of the pattern shape from a direction parallel to the work piece.

8. In a metal forming machine having a tool and a work piece relatively movable in two directions, a duplicator for forming said work piece to desired shape comprising, a pattern having a shape corresponding to the desired shape of the work piece, a first nozzle having a port to atmosphere through which fluid is continuously discharged from a pressure supply, means responsive to the rate of fluid discharged from said first nozzle for relatively moving said tool and work piece in one direction, a second nozzle having a port to atmosphere through which fluid is continuously discharged from a pressure supply, means responsive to rate of fluid discharged from said second nozzle for relatively moving said tool and work piece in the other direction, and means controlled by said pattern for simultaneously varying the rate of fluid discharged from said first and second nozzles.

9. In combination with a lathe having a tool movable in two directions, a pattern having a shape corresponding to the desired path of movement of said tool, a first nozzle having a port to atmosphere through which fluid is continuously discharged from a pressure supply, means responsive to the rate of fluid discharged from said first nozzle for moving said tool in one direction, a second nozzle having a port to atmosphere through which fluid is continuously discharged from a pressure supply, means responsive to the rate of fluid discharged from said second nozzle for moving said tool in the other direction, and means controlled by said pattern for simultaneously varying the rate of fluid discharged from said first and second nozzles.

10. In combination with a milling machine having a cutter, a work supporting table movable relative thereto and means for rotating a work piece relative to the work table, a duplicator for forming the work piece to desired shape comprising a pattern having a shape corresponding to the desired shape of the work piece, means including a fluid jet of normally constant pressure discharging to atmosphere and controlled by the pattern whereby the rate of the discharge of said jet is varied for relatively moving said work table and cutter, and means also controlled by said pattern for slowing down the rate of rotation of the work piece in correspondence with the rate of movement of the work supporting table.

11. In combination with a milling machine having a cutter, a work supporting table movable relative thereto and means for rotating a work piece relative to the work table, a duplicator for forming the work piece to desired shape, comprising, a pattern arranged to rotate with the work piece and having a shape corresponding to the desired shape of the work piece, means including a fluid jet of normally constant pressure discharging to atmosphere and controlled by the pattern for varying said normally constant pressure for relatively moving said work table and cutter in correspondence with radial changes in the contour of the pattern, and means also controlled by said pattern for slowing down the rate of rotation of the work piece in correspondence with radial changes in the contour of said pattern.

12. In combination with a milling machine having a cutter, a work supporting table movable relative thereto and means for rotating a work piece relative to the work table, a duplicator for forming the work piece to desired shape, comprising, a pattern arranged to rotate with the work piece and having a shape corresponding to the desired shape of the work piece, a first nozzle having a port to atmosphere through which fluid is continuously discharged from a pressure supply, means responsive to the rate of fluid discharged from said first nozzle for relatively moving said cutter and work piece, a second nozzle having a port to atmosphere through which fluid is continuously discharged from a pressure supply, means responsive to the rate of fluid discharged from said second nozzle for varying the rate of rotation of said work piece, and means controlled by said pattern for simultaneously varying the rate of fluid discharge from said first and second nozzles in correspondence with changes in the shape thereof.

13. In combination with a milling machine having a cutter, a work piece and means for relatively moving the cutter and work piece in angularly related directions, a duplicator for forming the work piece to desired shape comprising a pattern having a shape corresponding to the desired shape of the work piece, a first nozzle having a port to atmosphere through which fluid is continuously discharged from a pressure supply, means responsive to the rate of fluid discharge from said first nozzle for relatively moving the cutter and work piece in one direction, a second nozzle having a port to atmosphere through which fluid is continuously discharged from a pressure supply, means responsive to the rate of fluid discharge from said second nozzle for relatively moving the cutter and work piece in another direction, and means controlled by said pattern for simultaneously varying the rate of fluid discharge from said first and second nozzles in correspondence with changes in the shape thereof.

14. In a duplicator for machine tools and the like having a relatively movable tool and work piece, means for controlling relative movements between the tool and work piece comprising a port to atmosphere through which fluid is passed from a pressure supply, means including a pattern having a shape corresponding to the desired shape of the work piece, a tracer for traversing said pattern and against which said port discharges for controlling the rate at which fluid is passed through said port, a hydraulic servo-motor comprising a cylinder and piston for relatively moving said tool and work piece, a hydraulic pump connected to said cylinder on one side of said piston for supplying hydraulic fluid under pressure to move said piston in one direction, a connection to said cylinder on the opposite side of said piston through which hydraulic fluid is discharged as said piston is moved by the hydraulic fluid under pressure, and a variable resistance in said connection and means responsive to the rate at which fluid is passed through said port to atmosphere for varying said resistance to thereby vary the rate of movement of said piston.

15. In combination with a lathe having a tool movable relative to a work piece, a duplicator for causing the tool to form the work piece to a desired shape, comprising, a nozzle through which fluid is discharged to the atmosphere from a pressure supply, a pattern having a shape corresponding to the desired shape of the work piece for controlling the rate at which fluid is discharged to the atmosphere, a hydraulic servo-motor comprising a cylinder and piston for moving said tool relative to the work piece, a hydraulic pump connected to said cylinder on one side of said piston for supplying hydraulic fluid under pressure to move said piston in one direction, a connection to said cylinder on the opposite side of said piston through which hydraulic fluid is discharged as said piston is moved by the hydraulic fluid under pressure, a variable resistance in said connection, and means responsive to the rate at which fluid is discharged from said nozzle for varying said resistance to thereby vary the rate of movement of said piston.

16. In a duplicator for machine tools and the like having a relatively movable tool and work piece, means for controlling relative movements between the tool and work piece comprising a port to atmosphere through which fluid is passed from a pressure supply, means including a pattern having a shape corresponding to the desired shape of the work piece, a feeler traversing said pattern for controlling the rate at which fluid is passed through said port, a hydraulic servo-motor for relatively moving said tool and work piece, a hydraulic pump connected to said servo-motor for supplying hydraulic fluid under pressure, a discharge connection to said servo-motor, a variable resistance in said connection, and means responsive to the rate at which fluid is passed through said port to atmosphere for varying said resistance to thereby vary the rate of movement of said servo-motor.

17. In a duplicator mechanism for use with metal forming machines having a tool and a work piece relatively movable in two directions, a pattern having the desired shape of the work piece, a tracer for traversing said pattern, means including jets normally discharging fluid at a constant rate of atmosphere, means including said tracer for varying the rate of discharge of said jets and the rate of relative movement between the tool and work piece in the two directions, and adjustable means for varying the rate of relative movement of the tool and work piece in one direction for a given rate of relative movement in the other direction.

18. In a lathe having a relatively movable tool and work piece, a first hydraulic motor means for relatively moving the tool and work piece transversely, a second hydraulic motor means for relatively moving the tool and work piece longitudinally, a pattern having the desired shape of the work piece, a tracer mechanism including a jet normally discharging fluid at a constant pressure for traversing the pattern as the tool traverses the work, means operated by variations of said jet pressure created by said tracer for controlling the operation of said first hydraulic motor means, and a separate means operated by variations in said tracer jet pressure for controlling the operation of said second hydraulic motor means.

19. In a lathe having a relatively movable tool and work piece, a plurality of hydraulic motors for effecting relative movements of said tool and work piece simultaneously in angularly related paths, a pattern having the desired shape of the work piece, a tracer mechanism including a jet normally discharging fluid at a constant pressure for traversing the pattern as the tool traverses the work, and a separate means operated by variations created in the normally constant pressure of said tracer jet for controlling each of said hydraulic motors independently of the other.

20. In a metal forming machine having a relatively movable tool and work piece, a first motor means for relatively moving the tool and work piece in one direction, a second motor means for relatively moving the tool and work piece in another direction, a pattern, a tracer mechanism including a fluid jet of normally constant pressure for scanning the pattern as the tool operatively engages the work, means operated by variations created in said tracer jet pressure for controlling the operation of said first motor means, and a separate means operated by variations in said tracer jet pressure for controlling the operation of said second motor means.

21. In a duplicator for use with metal forming machines having a tool and work piece relatively movable in two directions, a tracer means including a jet normally discharging fluid to atmosphere at a constant pressure, means against which said jet discharges, including a pattern for varying said normally constant pressure, said change in pressure acting to vary the rate of relative movement between the tool and work piece in the two directions, and adjustable means for varying the rate of relative movement of the tool and work piece in one direction for a given rate of relative movement in the other direction.

CLARENCE JOHNSON.